United States Patent
Tran et al.

(10) Patent No.: US 6,205,541 B1
(45) Date of Patent: Mar. 20, 2001

(54) SYSTEM AND METHOD USING SELECTION LOGIC UNITS TO DEFINE STACK ORDERS

(75) Inventors: Thang M. Tran; Derrick R. Meyer, both of Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/235,883

(22) Filed: Jan. 22, 1999

Related U.S. Application Data

(63) Continuation of application No. 08/992,804, filed on Dec. 18, 1997, now Pat. No. 6,112,018.

(51) Int. Cl.$^7$ .................................................... G06F 9/30
(52) U.S. Cl. ................................................................ 712/217
(58) Field of Search .................................. 712/222, 217, 712/202

(56) References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,835,738 | 5/1989 | Niehaus et al. . |
| 4,858,105 | 8/1989 | Kuriyama et al. . |
| 4,928,223 | 5/1990 | Dao et al. . |
| 5,001,629 | 3/1991 | Murakami et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,367,650 * | 11/1994 | Sharangpani et al. . |
| 5,487,022 * | 1/1996 | Simpson et al. ................ 708/205 |
| 5,634,046 | 5/1997 | Chatterjee et al. . |
| 5,634,118 | 5/1997 | Blomgren . |
| 5,640,582 | 6/1997 | Hays et al. . |
| 5,651,125 | 7/1997 | Witt et al. . |
| 5,696,955 | 12/1997 | Goddard et al. . |
| 5,727,176 * | 3/1998 | Clift et al. . |
| 5,771,366 | 6/1998 | Bjorksten et al. . |
| 5,852,726 * | 12/1998 | Lin et al. ............................. 712/200 |
| 5,857,089 * | 1/1999 | Goddard et al. ................... 712/222 |
| 5,944,810 * | 8/1999 | Cherabuddi .......................... 712/23 |
| 5,978,901 * | 8/1998 | Signaigo ............................... 361/64 |
| 6,018,798 * | 1/2000 | Witt et al. ........................... 712/220 |
| 6,035,391 * | 3/2000 | Isaman ................................ 712/222 |
| 6,061,786 * | 5/2000 | Witt .................................... 712/237 |

FOREIGN PATENT DOCUMENTS

| | | | |
|---|---|---|---|
| 0259095 | * | 3/1988 | (EP) . |
| 0381471 | * | 8/1990 | (EP) . |
| 0459232 | * | 12/1991 | (EP) . |
| 2263985 | * | 8/1993 | (GB) . |
| 2263987 | * | 8/1993 | (GB) . |
| 2281422 | * | 3/1995 | (GB) . |

* cited by examiner

Primary Examiner—William M. Treat
Assistant Examiner—S. Whitmore
(74) Attorney, Agent, or Firm—Conley, Rose & Tayon, P.C.

(57) ABSTRACT

A floating point unit capable of executing multiple instructions in a single clock cycle using a central window and a register map is disclosed. The floating point unit comprises: a plurality of translation units, a future file, a central window, a plurality of functional units, a result queue, and a plurality of physical registers. The floating point unit receives speculative instructions, decodes them, and then stores them in the central window. Speculative top of stack values are generated for each instruction during decoding. Top of stack relative operands are computed to physical registers using a register map. Register stack exchange operations are performed during decoding. Instructions are then stored in the central window, which selects the oldest stored instructions to be issued to each functional pipeline and issues them. Conversion units convert the instruction's operands to an internal format, and normalization units detect and normalize any denormal operands. Finally, the functional pipelines execute the instructions.

18 Claims, 23 Drawing Sheets

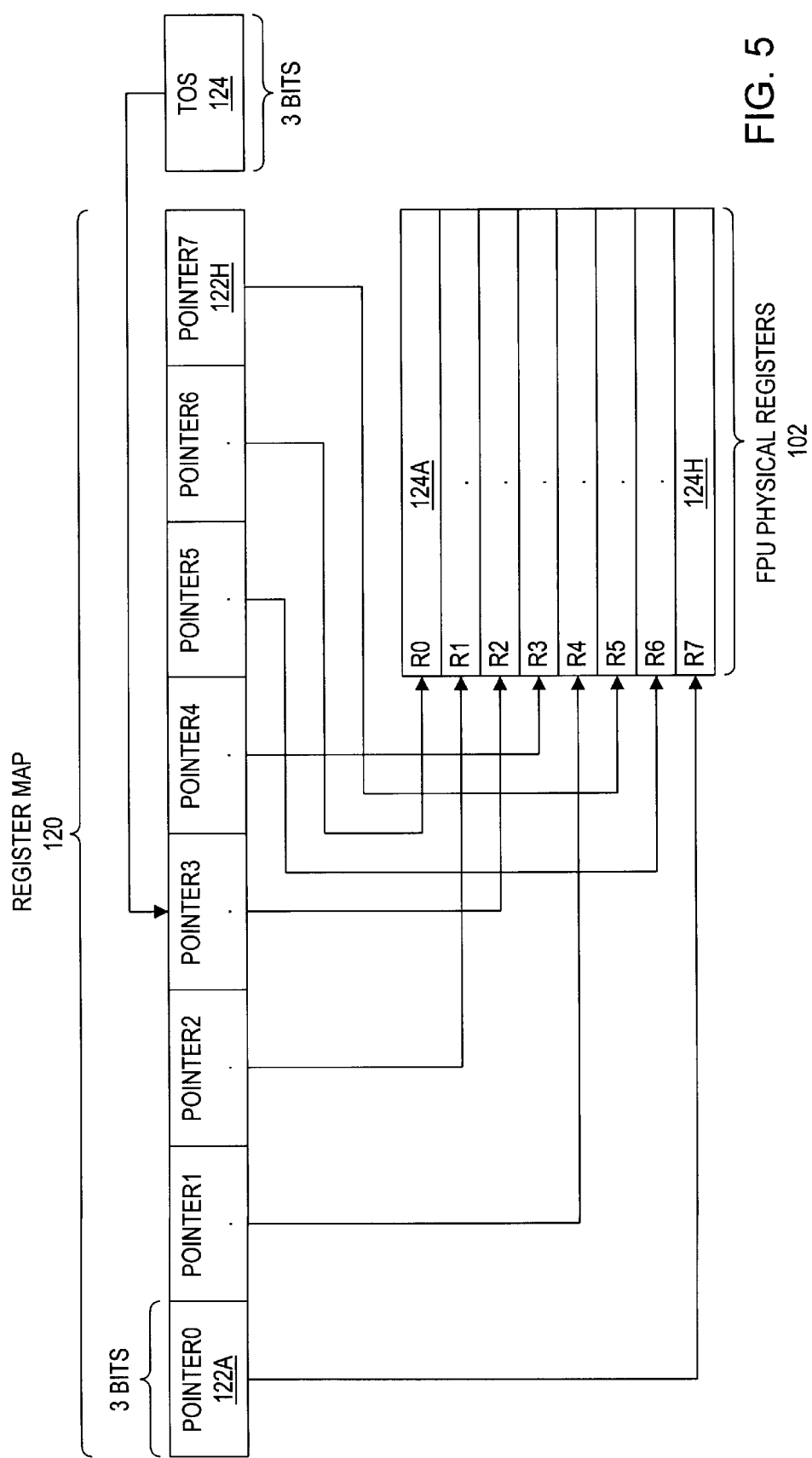

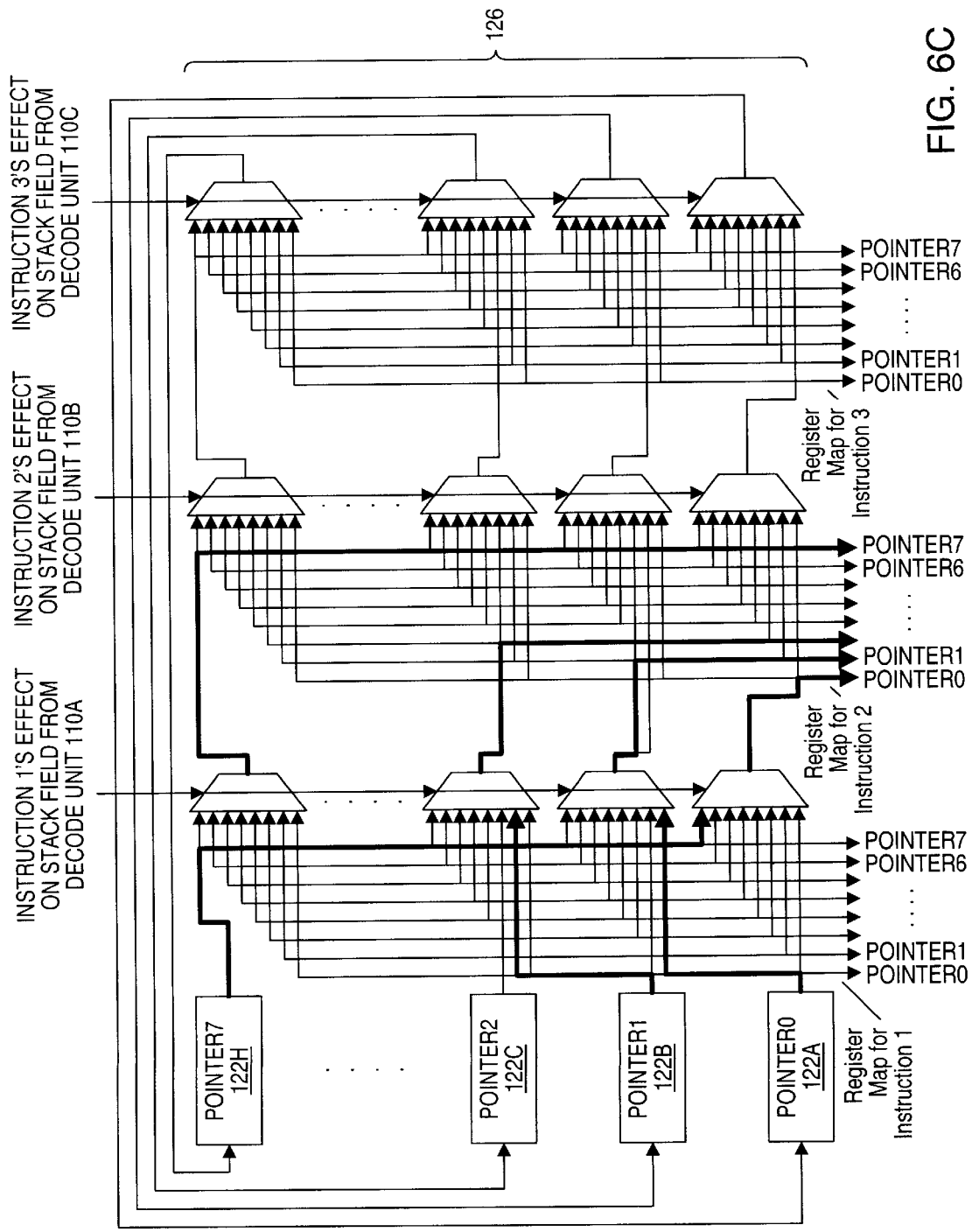

RESULT QUEUE

RESULT QUEUE ENTRY

FLOATING POINT DATA FORMATS

CONVERSION FROM DENORMALIZED TO NORMALIZED

FLOATING POINT DATA FORMAT CONVERSION

DETAIL OF FLOATING POINT DATA FORMAT CONVERSION

NORMALIZATION

SYSTEM AND METHOD USING SELECTION LOGIC UNITS TO DEFINE STACK ORDERS

This application is a continuation of U.S. Ser. No. 08/992,804, filed Dec. 18, 1997, now U.S. Pat. No. 6,112, 018.

BACKGROUND OF THE INVENTION

1. Field of the Invention

This invention relates generally to the field of microprocessors and, more particularly, to the issuing of instructions and the handling of register stacks within floating point units.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Generally speaking, a pipeline comprises a number of stages at which portions of a particular task are performed. Different stages may simultaneously operate upon different items, thereby increasing overall throughput. Although the instruction processing pipeline may be divided into any number of stages at which portions of instruction processing are performed, instruction processing generally comprises fetching the instruction, decoding the instruction, executing the instruction, and storing the execution results in the destination identified by the instruction.

Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

Microprocessors compatible with the x86 instruction set are configured to operate upon various data types in response to various instructions. For example, certain x86 instructions are defined to operate upon an integer data type. Another data type employed in x86 compatible microprocessors is the floating point data type. Floating point numbers are represented by a significand and an exponent. The base for the floating point number is raised to the power of the exponent and multiplied by the significand to arrive at the number represented. In x86 compatible microprocessors base 2 is used. The significand comprises a number of bits used to represent the most significant digits of the number. Typically, the significand comprises one bit to the left of the decimal, and the remaining bits to the right of the decimal. The bit to the left of the decimal, known as the integer bit, is typically not explicitly stored. Instead, it is implied in the format of the number. Additional information regarding the floating point numbers and operations performed thereon may be obtained in the Institute of Electrical and Electronic Engineers (IEEE) standard 754.

Floating point numbers can represent numbers within a much larger range than can integer numbers. For example, a 32 bit signed integer can represent the integers between $2^{31}-1$ and $-2^{31}$, when two's complement format is used. A single precision floating point number as defined by IEEE 754 comprises 32 bits (a one bit sign, 8 bit biased exponent, and 24 bits of significand) and has a range from $2^{-126}$ to $2^{127}$ in both positive and negative numbers. A double precision (64 bit) floating point value has a range from $2^{-1022}$ and $2^{1023}$ in both positive and negative numbers. Finally, an extended precision (80-bit) floating point number (in which the integer bit is explicitly stored) has a range from $2^{-16382}$ to $2^{16383}$ in both positive and negative numbers.

Floating point data types and floating point instructions produce challenges for the x86 compatible microprocessor designer. For example, the eight data registers of an x86 compatible floating point unit (FPU) are configured to store values up to 80 bits in length, while x86 integer registers store values that are 32 bits or less. Furthermore, the FPU data registers are configured to operate as a stack, i.e., FPU instructions address the FPU data registers relative to the register on the top of the stack. The top of stack (TOS) is stored as a pointer in the status register.

Because the FPU must accommodate 80-bit floating point operands, designing the FPU to efficiently manipulate the register stack is difficult. For example, the exchange registers instruction (FXCH) swaps the contents of the destination register and the TOS register. Typically this instruction involves three steps: (1) the contents of the TOS registers are copied to a temporary storage register, (2) the contents of the destination register are copied to the TOS register, and (3) the contents of the temporary storage register are copied into the destination register.

The additional data paths, temporary storage registers, and control circuitry for instructions that manipulate the register stack increase the size of the microprocessor, particularly in light of the large size of the operands (up to 80 bits). This in turn disadvantageously reduces the maximum clock rate at which the microprocessor can operate, increases the power dissipation of the microprocessor, and reduces the yield in manufacturing the microprocessor. Therefore, a more efficient mechanism for handling register stack manipulations in floating point units is desired.

Furthermore, overall demand on floating point units has continued to increase as application programs have increasingly incorporated more graphics and multimedia routines. MMX (multimedia extension) instructions have been added to the x86 instruction set to increase multimedia performance. However, these instructions are typically performed within the floating point unit, thereby increasing the need for a higher throughput of instructions through the combined floating point/MMX unit. Thus a mechanism for increasing the number of instructions executed per clock cycle in a floating point unit is also desired.

Register addressing within floating point units that execute My instructions is further complicated because x86 floating point instructions use stack relative addressing to access the FPU registers, while MMX instructions typically use absolute (non-stack-relative) addressing to access the FPU registers. Thus, FPU and NMX instructions can have one of six effects on the top of stack: 1) push (decreases the top of stack by one); 2) pop (increases the top of stack by one); 3) double pop (increases the top of stack by two); 4) exchange (which switches the top of stack register with another register); 5) reset (resets the top of stack); or 6) no change. Thus an efficient mechanism for dealing with both stack-relative and non-stack-relative register addressing in a floating point unit is desired.

SUMMARY OF THE INVENTION

The problems outlined above are in large part solved by a superscalar floating point unit configured in accordance with the present invention. Broadly speaking, the present invention contemplates a superscalar microprocessor that uses a register map and register pointers to access a register stack. Advantageously, this configuration may allow multiple instructions per clock cycle to access the register stack using top of stack relative addressing. By manipulating register pointers instead of the actual register values, this configuration may also allow multiple register stack manipulations to be performed per cycle.

In one embodiment, the floating point unit comprises a plurality of physical registers configured to store floating point values. The registers are configured to be accessed as a stack. A storage register is configured to store a register map comprising a number of register pointers, each pointing to one of the physical registers. A storage location is designated to store a top of stack pointer.

Also contemplated is an apparatus for exchanging pointers within the register map by using a plurality of multiplexers. By using multiplexers, the shifting of pointers in the register map is simplified. Advantageously, the multiplexers may be configured to allow multiple shifts per clock cycle. Furthermore, the multiplexers may be configured to allow both stack-relative and non-stack-relative access to the registers through the register map.

In one embodiment, the apparatus for exchanging two stack registers comprises: a plurality of registers accessible as a stack; a plurality of storage locations, each configured to store a pointer to one of the registers; and two sets of multiplexers. Each multiplexer in the first set of multiplexers is coupled to each of the storage locations and is configured to select a particular storage location for output according to a first decoded instruction. Each multiplexer in the second plurality of multiplexers is configured to receive the output from each multiplexer in the first set and select one for output according to a second decoded instruction. The contents of the storage locations define a first order of the register stack. The outputs of the first set of multiplexers defines a second order, and the outputs of the second set of multiplexers defines a third order. The plurality of storage locations are configured to receive and store the output from each multiplexer in the second set after each clock cycle.

Another contemplated feature is a central window. In one embodiment, the floating point unit uses a central window to store instructions and their associated data. The central window is configured to store the instructions until they are issued, when a conversion unit receives the instructions and converts the instructions' data to an internal format. The instructions and their data are then sent to a normalization unit which detects and normalizes any denormalized data. A functional pipeline then executes the instruction. This feature may advantageously improve the performance of the floating point unit by performing the conversion to internal format when the instruction is issued instead of when the data is received from memory. Storing the data directly into a central window may speed memory access time. Furthermore, a central window may allow multiple instructions to executed in a given clock cycle. A central window may also simplify the hardware needed to select which instruction should be issued in a given clock cycle.

A method for operating a floating point unit is also contemplated. In one embodiment, the method comprises decoding a plurality of instructions during a first clock cycle. During a second clock cycle, a new top of stack pointer is calculated for each decoded instruction. All stack-relative register accesses are resolved during the second clock cycle, and a register map is used to perform stack manipulations. During a third clock cycle, the resolved stack-relative register accesses are stored in a central window. During a fourth clock cycle, the oldest outstanding instruction that is ready to issue is selected and issued to a functional pipeline.

BRIEF DESCRIPTION OF THE DRAWINGS

Other objects and advantages of the invention will become apparent upon reading the following detailed description and upon reference to the accompanying drawings in which.

FIG. 5 is a block diagram depicting one embodiment of the relationship between the register map and the register stack depicted in FIG. 3.

FIG. 6C illustrates the operation of the TOS calculation units depicted in FIG. 4 for a PUSH instruction.

Figure 1:
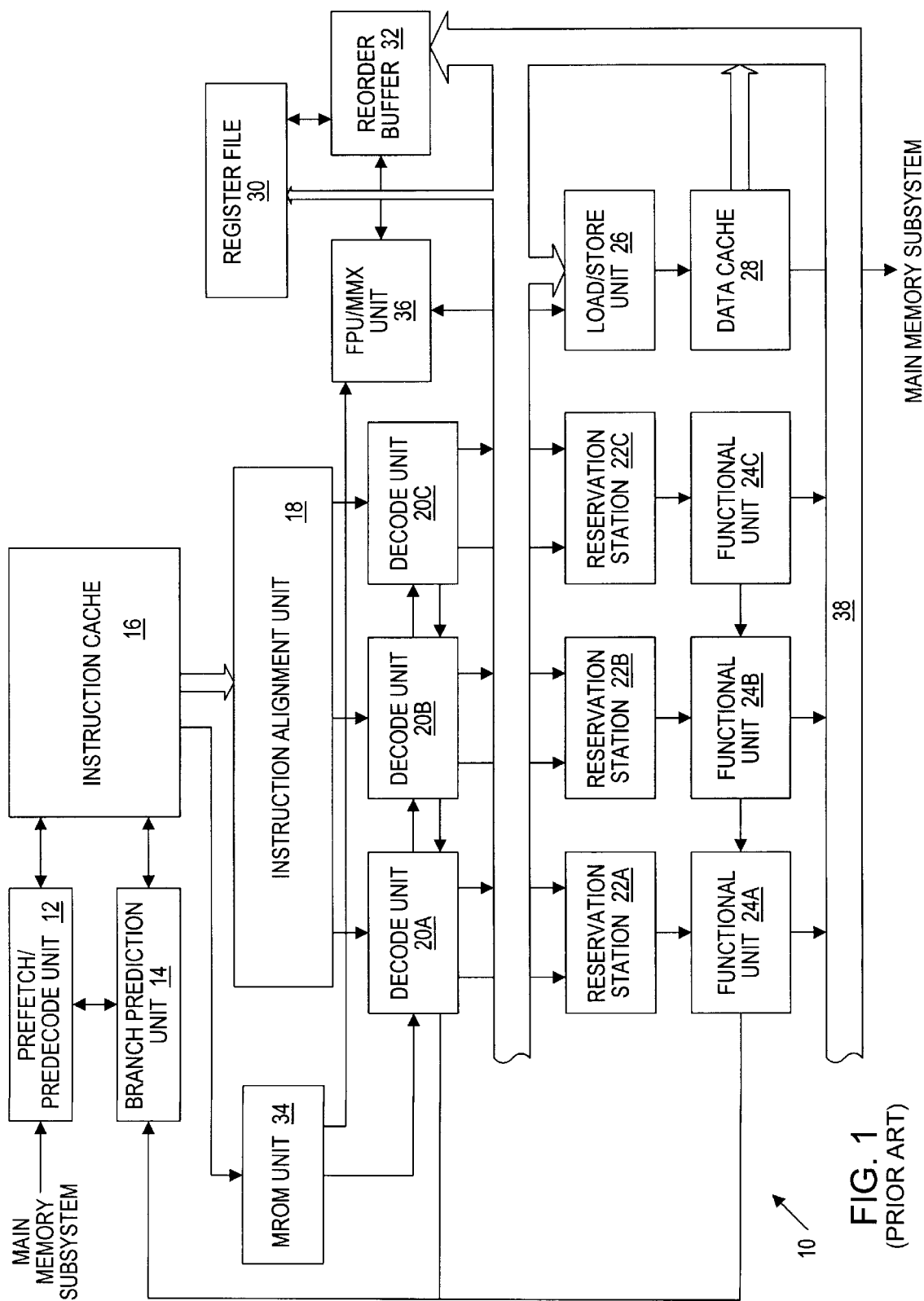
FIG. 1 is a block diagram of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF AN EMBODIMENT

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a. plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20 and FPU/Mx unit 36. The terms "FPU" and "FPU/MMX unit" are used interchangeably and should be understood to include floating point units with or without functional pipelines capable of performing M instructions.

Instruction cache 16 is a high speed cache memory configured to store instructions. Instructions are fetched from instruction cache 16 and dispatched to decode units 20. In one embodiment, instruction cache 16 is configured to store up to 64 kilobytes of instructions in a 4-way set-associative structure having 32-byte lines (a byte comprises 8 binary bits). Alternatively, 2-way set-associativity may be employed as well as any other desired associativity. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/MMX byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/MMX byte indicates the presence of an SIB byte. If the functional bit for the Mod R/MMX byte is set, then an SIB byte is present. Alternatively, if the functional bit for the Mod R/MMX byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20 or FPU/MMX unit 36 in the case of floating point instructions. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. If decode units 20 detect a floating point instruction, the instruction is dispatched to FPU/MMX unit 36.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e., instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
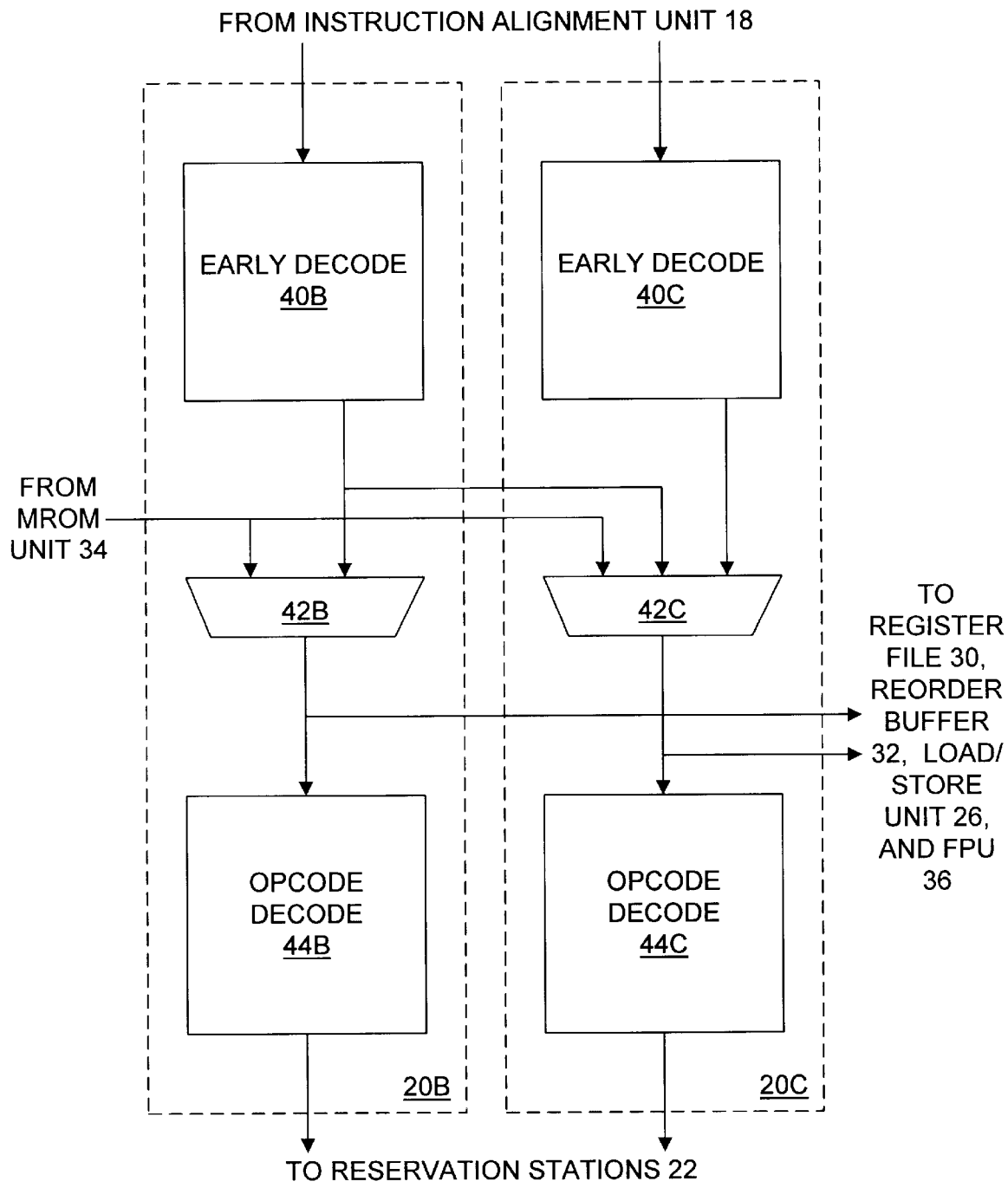
FIG. 2 is a block diagram of one embodiment of the decode units shown in FIG. 1.

Turning now to FIG. 2, a block diagram of one embodiment of decode units 20B and 20C is shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexer 42B, and opcode decode unit 44B. Similarly, decode unit 20C includes early decode unit 40C, multiplexer 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexer 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B3 to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexers 42 are routed to register file 30 and reorder buffer 32. Operand values or tags may thereby be routed to reservation stations 22. Additionally, memory operands are detected by early decode units 40. Therefore, the outputs of multiplexers 42 are routed to load/store unit 26. Memory operations corresponding to instructions having memory operands are stored by load/store unit 26.

Figure 3:
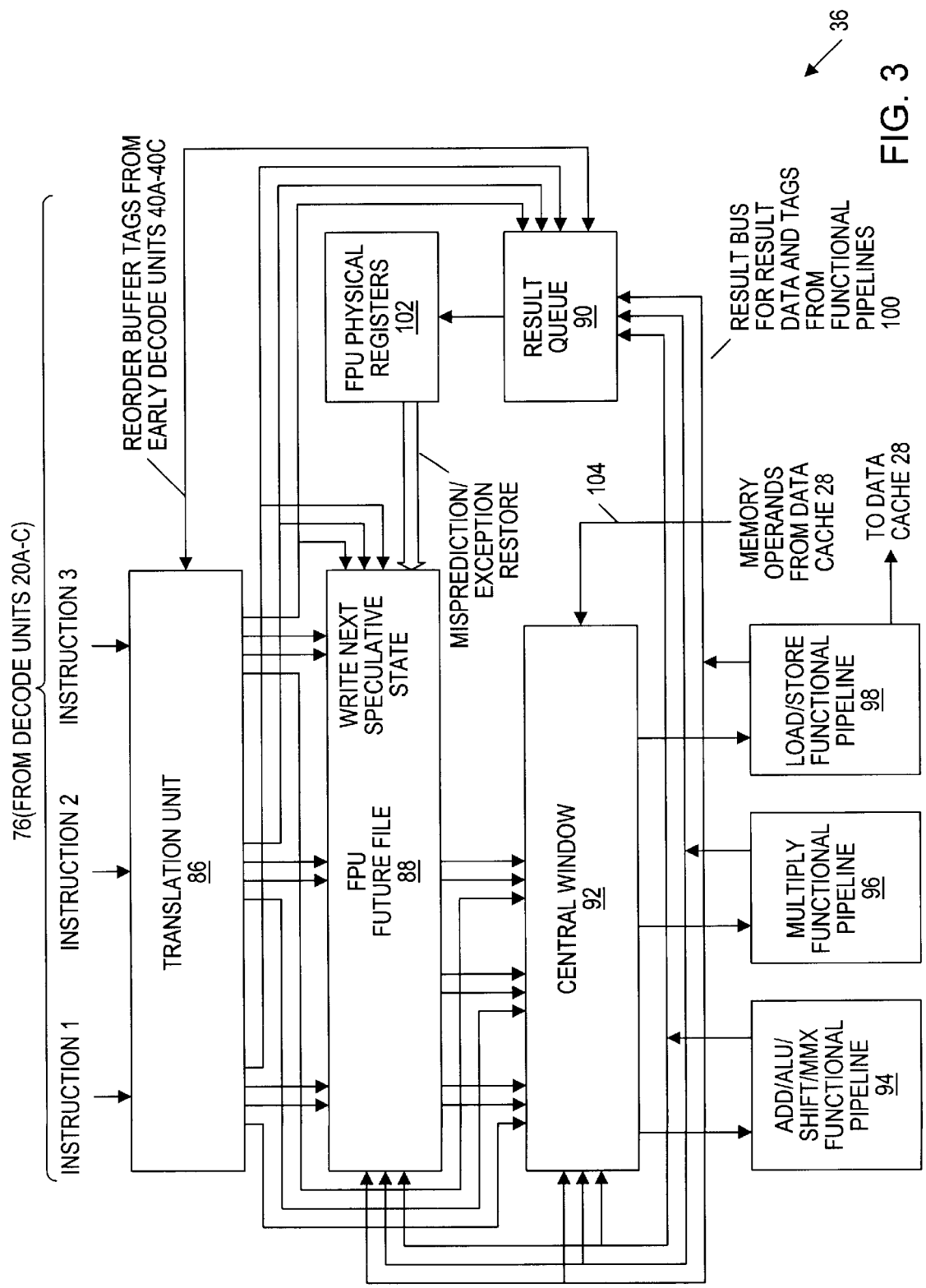
FIG. 3 is a diagram showing one embodiment of the FPU/MMX unit shown in FIG. 1.

Turning now to FIG. 3, one embodiment of FPU/MMX unit 36 is shown. FPU/MMX unit 36 comprises a translation unit 86, a future file 88, a result queue 90, a central window 92, three functional pipelines 94–98, and a set of physical registers 102. Translation unit 86 is coupled to future file 88, to result queue 90, and to central window 92. Central window 92 is coupled to three functional pipelines 94–98, including ADD/ALU/SHIFT/MMX pipeline 94, MULTIPLY pipeline 96, and LOAD/STORE pipeline 98. Functional pipelines 94–98 are also coupled to result queue 90 and future file 88 via result bus 100.

Generally, translation unit 86 receives up to three instructions per clock cycle from decode units 20A–C or NROM unit 34 on FPU interface bus 76. As each instruction is issued speculatively, it is accompanied by a reorder buffer tag, which provides information as to each instruction's relative program order. Result queue 90 also receives these reorder buffer tags and uses them to allocate storage locations for the storing the instructions' results when they are executed. In parallel, translation unit 86 decodes the three instructions and translates any associated register operands to their corresponding physical FPU register.

Once the three sets of register operands are decoded, they are used to access future file 88, which stores the current speculative state of the physical FPU registers 102. The physical FPU registers comprise eight individual registers accessed as a stack by floating point instructions. Future file 88 also comprises a set of eight registers having the same configuration as the physical FPU registers 102. Each register in future file 88 stores the speculative state of one corresponding register in physical FPU registers 102.

While future file 88 is being accessed, the three opcodes and their associated reorder buffer tags are passed directly from translation unit 86 to central window 92, which allocates a storage location for each opcode, its reorder buffer tag, and its associated register operands. Once future file 88 has accessed the current speculative state of the physical registers corresponding to the translated register operands, their speculative values are conveyed to central window 92. Any memory operands required by the opcodes are received from the data cache (or main memory in the case of a cache miss) on memory access bus 104. Load/store unit 26 performs the actual memory accesses to data cache 28 to retrieve the memory operands. Similarly, any results required from previously executed instructions are stored when they become available on result bus 100.

In one embodiment, central window 92 has fifteen storage locations. Each clock cycle, central window 92 selects up to three of the oldest outstanding entries which are ready for dispatch and dispatches them to the three functional pipelines 94–98. When the functional pipelines 94–98 have completed executing the instructions, the results are conveyed on result bus 100 to result queue 90, central window 92, and future file 88. Result queue 90 monitors result bus 100 and stores the results in their reserved storage locations according to their reorder buffer tags. Future file 88 also stores the results, thereby updating the speculative state of the FPU/MMX unit 36. As previously noted, central window 92 also monitors the results bus 100 for any possible results that stored instructions may require before executing.

When result queue 90 receives an indication from reorder buffer 32 that a particular instruction is next in program order to be retired, result queue 90 copies the results to the FPU physical registers 102, thereby updating the current non-speculative state of FPU/MMX unit 36. In the event of a branch misprediction or exception, FPU/MMX unit 36 flushes all instructions in central window 92 and result queue 90 that occurred after the mispredicted branch instruction. In addition, the speculative state in future file 88 is rebuilt by copying the values from the physical registers 102 to the corresponding registers in the future file 88.

Figure 4:
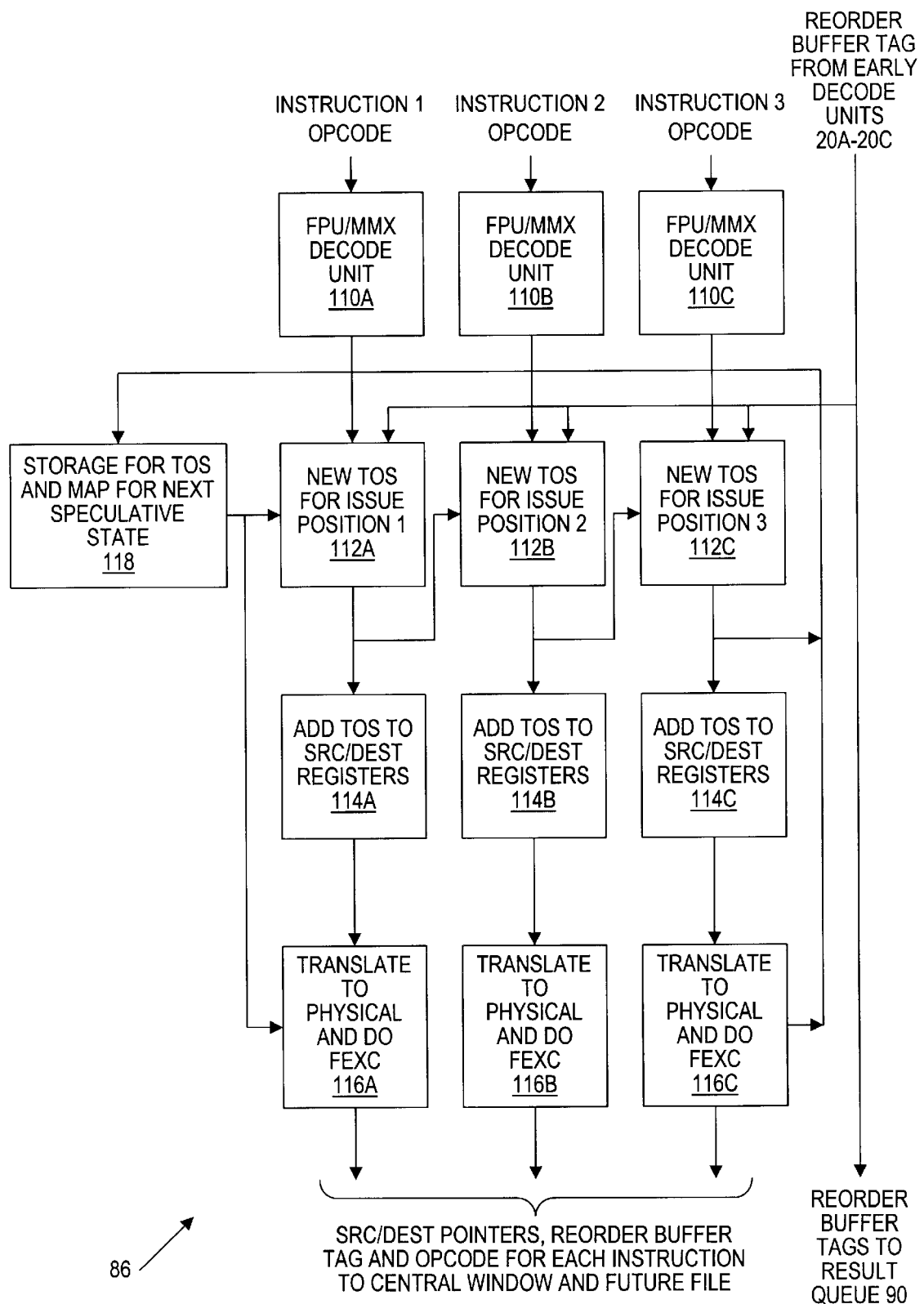
FIG. 4 is a block diagram of one embodiment of the translation unit shown in FIG. 3.

Turning now to FIG. 4, details of one embodiment of translation unit 86 are shown. Translation unit 86 comprises a storage unit 118 and three FPU/MMX decode units 110A–110C, three top of stack pointer (TOS) calculation units 112A–112C, three addition units 114A–114C, and three physical translation units 116A–116C. FPU/MMX decode units 110A–110C receive instruction opcodes from reorder buffer 32 or MROM unit 34. In the embodiment shown, up to three instructions per clock cycle may be received by translation unit 86. Once the instructions are received by FPU/MMX decode units 110A–110C, they are decoded and any associated operands, which takes one clock cycle, CLK1.

During CLK1, the decoders 110A–110C work in parallel to determine the following information for each of the three opcodes:

(1) the type of instruction (i.e., the decoded opcode),
(2) which of the three functional paths 94–98 will be used
(3) any source and destination register pointers,
(4) the effect on the stack (i.e., increment/decrement, exchange, or clear),
(5) the type of operands, and
(6) the number of memory operands required (if any).

Note that the instruction decoded in FPU/MMX decode unit 110A is referred to hereinafter as Instruction 1. Similarly, the instructions decoded in FPU/MMX decode units 110B and 110C are referred as Instruction 2 and Instruction 3, respectively. Instruction 1 occurs before Instruction 2 in program order. Similarly, Instruction 2 occurs before Instruction 3 in program order. Each set of three instructions is also dispatched to translation unit 86 in program order, thus three instructions being decoded in a given clock cycle occur before, in program order, the three instructions that will be decoded in the next subsequent clock cycle.

After the instructions are decoded, they are conveyed to TOS calculation units 112A–112C. During the second clock cycle, CLK2, a number of calculations are performed, as described in detail below. In parallel with these calculations, load or store operations for the movement of data may also be decoded.

1. Calculating new TOS

During CLK2, physical stack register source and destination pointers are calculated for the three instructions latched into TOS calculation units 112A–112C. TOS calculation units 112A–112C also latch the reorder buffer tag associated with each respective instruction from decode units 20A–20C. Once all the necessary information is latched, the top of stack pointer ("TOS") is calculated for each instruction. The current speculative TOS which is stored in storage unit 118 (from a previous clock cycle) is used as the starting point for Instruction 1. The current speculative TOS is incremented or decremented according to the effect on stack information that was decoded during CLK1 for Instruction 1. Once the new TOS for Instruction 1 is calculated, it is forwarded as the starting point for the instruction latched into TOS calculation unit 112B, i.e., Instruction 2. Similarly, once Instruction 2's new TOS is calculated, it is forwarded for use as the starting point for instruction 2's TOS calculation. Once Instruction 3's TOS is calculated, it is stored in storage unit 118 for use as the starting point for the next clock cycle.

2. Offsetting Source and Destination Pointers by TOS

After the TOS for an instruction is calculated, the instruction, the TOS and the instruction's reorder buffer tag are conveyed to one of the three addition units 114A–114C. Addition units 114A–114C add the instruction's calculated TOS to the instruction's stack-relative source and destination register pointers.

This calculation can be illustrated by the following example. Note that the FLD instruction decrements the current TOS and then loads a value from the stack having a given offset. Note that the FLD instruction uses the initial TOS (before the decrement) for the source calculation (as indicated by * in the table below).

| From Previous Clock Cycle | Instruction 1: FADD ST, ST(2) | Instruction 2: FLD ST(2) | Instruction 3: FLD ST(1) |
|---|---|---|---|
| TOS=3 → | No effect on TOS TOS=3 → Source=2 | Decrement TOS TOS=2 → | Decrement TOS |

-continued

| Source=Source+TOS | Source=1 | TOS=1 |
| Source=5 | Source=Source+TOS* | Source=1 |
| Destination=TOS | Source=4 | Source=Source+TOS* |
| Destination=3 | Destination=TOS | Destination=2 |
| | | Source=3 |
| | | Destination=TOS |
| | | Destination=1 |

| Stack: | Stack: | Stack: | Stack: |
|---|---|---|---|
| 0 567 . . . | 567 . . . | 567 . . . | 567 . . . |
| 1 434 . . . | 434 . . . | 113 . . . | 894 . . . (TOS) |
| 2 557 . . . | 557 . . . | 900 . . . (TOS) | 900 . . . |
| 3 113 . . . (TOS) | 894 . . . (TOS) | 894 . . . | 894 . . . (Source) |
| 4 900 . . . | 900 . . . | 900 . . . (Source) | 900 . . . |
| 5 781 . . . | 781 . . . (Source) | 781 . . . | 781 . . . |
| 6 178 . . . | 178 . . . | 178 . . . | 178 . . . |
| 7 332 . . . | 332 . . . | 332 . . . | 332 . . . |

Note that the stacks shown above are for illustrative purposes only. They illustrate the status of the stack after completion of each instruction. During actual operation of FPU/MMX unit 36 the instructions would not complete execution until a subsequent clock cycle.

3. Translating to Physical Registers

Once the stack relative source and destination register pointers have been offset, they are conveyed along with their corresponding instructions and reorder buffer tags to physical translation units 116A–116C. Physical translation units 116A–116C remap the source and destination register pointers to physical registers using a register map. Physical translation unit 116A receives the current speculative register map from storage location 118. Physical translation unit 116A alters the register map if required by Instruction 1 and then provides the updated register map to physical translation unit 116B. Similarly, once physical translation unit 116B has completed any modifications to the register map required by Instruction 2, the updated register map is provided to physical translation unit 116C. Once physical translation unit 116C has performed any modifications on the register map as required by Instruction 3, the register map is stored in storage location 118 for use by the next three instructions that propagate through physical translation units 116A–116C during the next clock cycle.

Turning now to FIG. 5, a diagram illustrating one embodiment of a register map is shown. Register map 120 comprises eight pointers 122A–122H. Each pointer 122A–122H points to one of the eight physical registers 124A–124H within the FPU register stack 102 (and corresponding registers in future file 88). As there are eight physical registers 124A–124H, each pointer is three bits long. The TOS pointer 124 is also three bits long, and points to one of the eight pointers 122A–122H, which in turn points to one of the eight physical registers 124A–124H that is at the top of the stack. While TOS pointer 124 is shown explicitly in FIG. 5, for purposes of the register map 120 the TOS may be implicitly stored by always rotating register map 120 so that the pointer that points to the top of stack is always in a particular position. For example, register map 120 could be rotated so that the pointer that points to the top of stack is always the first pointer in the register map (i.e., POINTER0).

Use of register map 120 may advantageously allow register stack manipulation without requiring extra 80-bit registers for storing temporary values. In addition, specific stack manipulation instructions such as FXCH (exchange register contents) may be performed within physical translation units 116A–116C and without requiring a dedicated execution clock cycle. The FXCH instruction exchanges the contents of the top of stack register with a destination register. For example:

Without a Register Map

| Before Instruction: | | | After Instruction: | |
|---|---|---|---|---|
| Phys. Reg. | Value | Instruction: | Phys. Reg. | Value |
| 0 | 333 | FXCH ST(2) | 0 | 765 |
| 1 | 452 | when | 1 | 452 |
| 2 | 765 | TOS = 0 | 2 | 333 |
| 3 | 342 | | 3 | 342 |
| 4 | 452 | | 4 | 452 |
| 5 | 344 | | 5 | 344 |
| 6 | 117 | | 6 | 117 |
| 7 | 877 | | 7 | 877 |

With Register Map

| Before Instruction: | | | | After Instruction: | | |
|---|---|---|---|---|---|---|
| Phys Reg. | Value | Reg. Map | Instruction: | Phys. Reg. | Value | Reg. Map |
| 0 | 333 | 0 | FXCH ST(2) | 0 | 333 | 2 |
| 1 | 452 | 1 | when | 1 | 452 | 3 |
| 2 | 765 | 2 | TOS = 0 | 2 | 765 | 0 |
| 3 | 342 | 3 | | 3 | 342 | 1 |
| 4 | 452 | 4 | | 4 | 452 | 4 |
| 5 | 344 | 5 | | 5 | 344 | 5 |
| 6 | 117 | 6 | | 6 | 117 | 6 |
| 7 | 877 | 7 | | 7 | 877 | 7 |

A translation unit such as the embodiment depicted in FIG. 4 which utilizes three parallel physical translation units 116A–116C may advantageously allow up to three FXCH instructions to be executed per clock cycle. At the end of CLK2, physical translation units 116A–116C convey the decoded instructions, reorder buffer tags, and translated source and destination register pointers to future file 88 and central window 92.

Figure 6A:
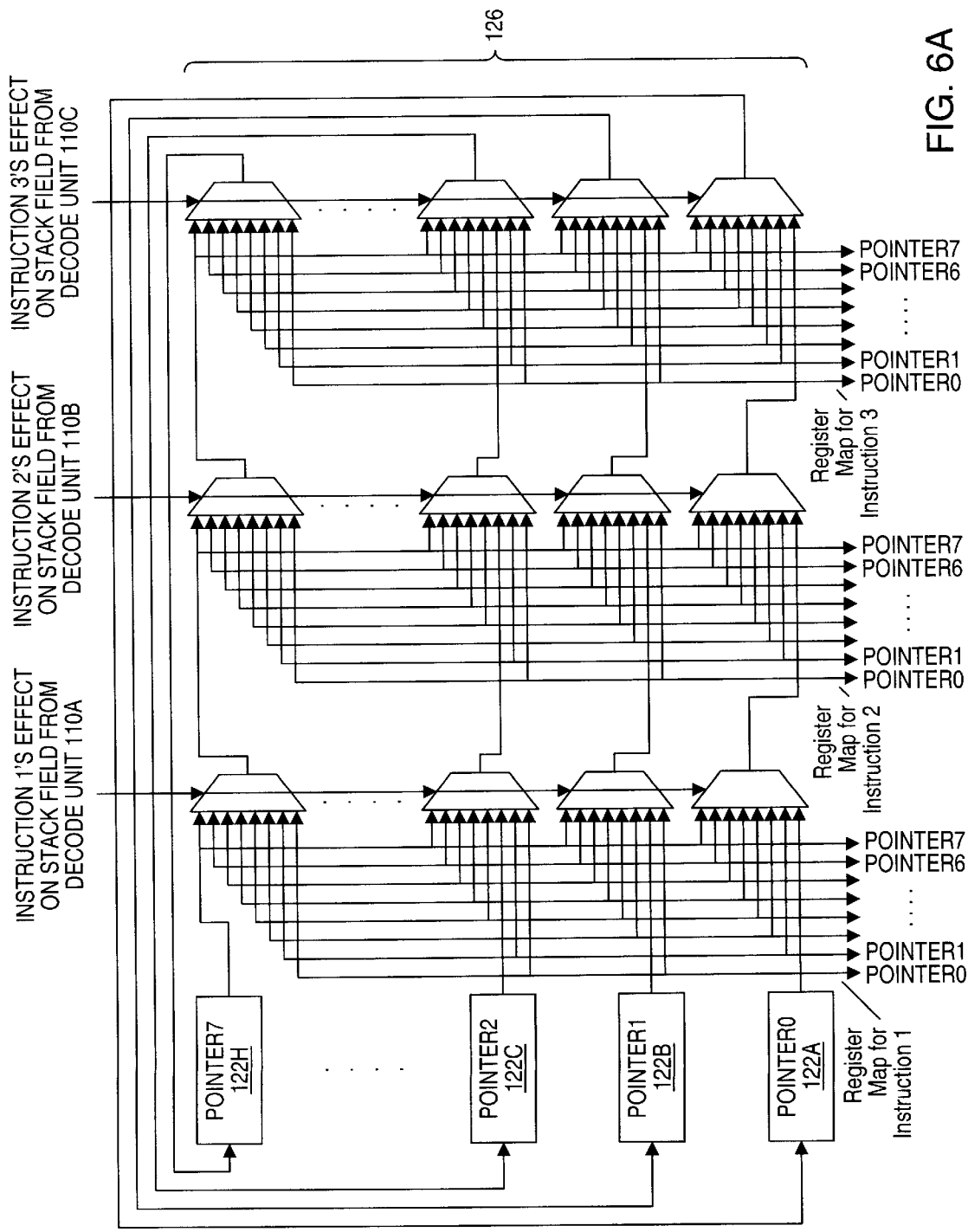
FIG. 6A is a diagram showing detail of one embodiment of the TOS calculation units depicted in FIG. 4.
Figure 6B:
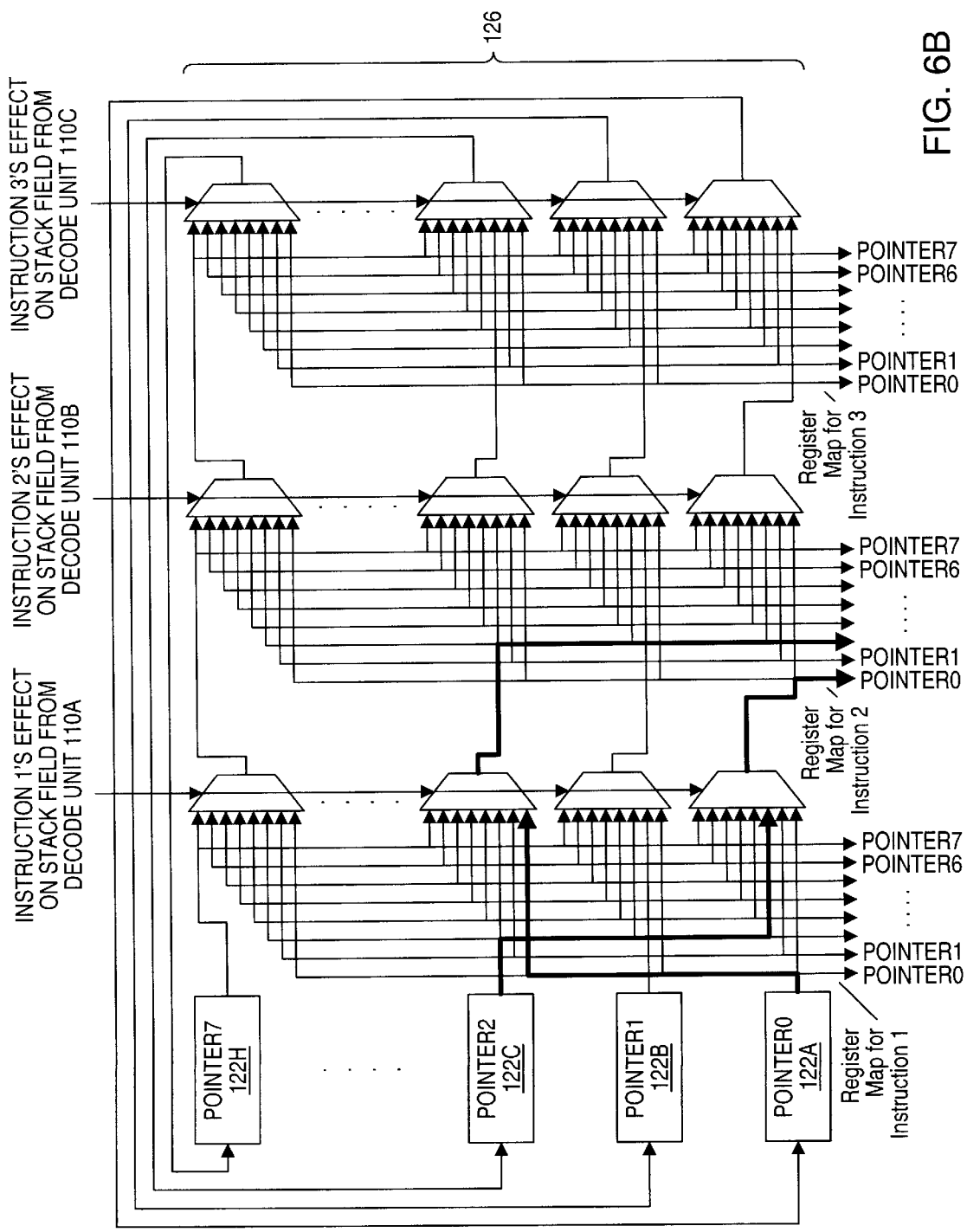
FIG. 6B illustrates the operation of the TOS calculation units depicted in FIG. 4 for an exchange (FXCH) instruction.

Turning now to FIG. 6A, details of one embodiment of TOS calculation units 112A–112C and addition units 114A–114C are shown. TOS calculation units 112A–112C and addition units 114A–114C comprise a plurality of eight-to-one multiplexers 126, wherein each multiplexer corresponds to one of the eight register pointers in register map 120 and one of the three FPU/MMX decode units 110A–110C. Therefore, each column of multiplexers corresponds to one of the three instructions decoded per clock cycle. Each multiplexer receives as input the eight pointers in register map 120 and a decoded instruction from one of decode units 110A–110C. After receiving the pointers and decoded instructions, each multiplexer selects one of the register pointers as directed by the decoded instruction. FIG. 6B illustrates the operation of multiplexers 126 for a FXCH instruction in the first issue position. Similarly, FIG. 6C illustrates the operation of multiplexers 126 for a PUSH instruction in the first issue position. A PUSH instruction shifts all pointers in the register map, thereby effectively rotating the entire register map one position. The cumulative number of positions the register map is shifted is stored with the register map as a "shift count." The shift count is incremented for each POP and decremented for each PUSH. For example, an instruction that POPs the stack would increase the shift count by one. The shift count allows the translation units 116A–116C to resolve absolute (i.e., non-stack relative) addressing used by MMX instructions.

Figure 6D:
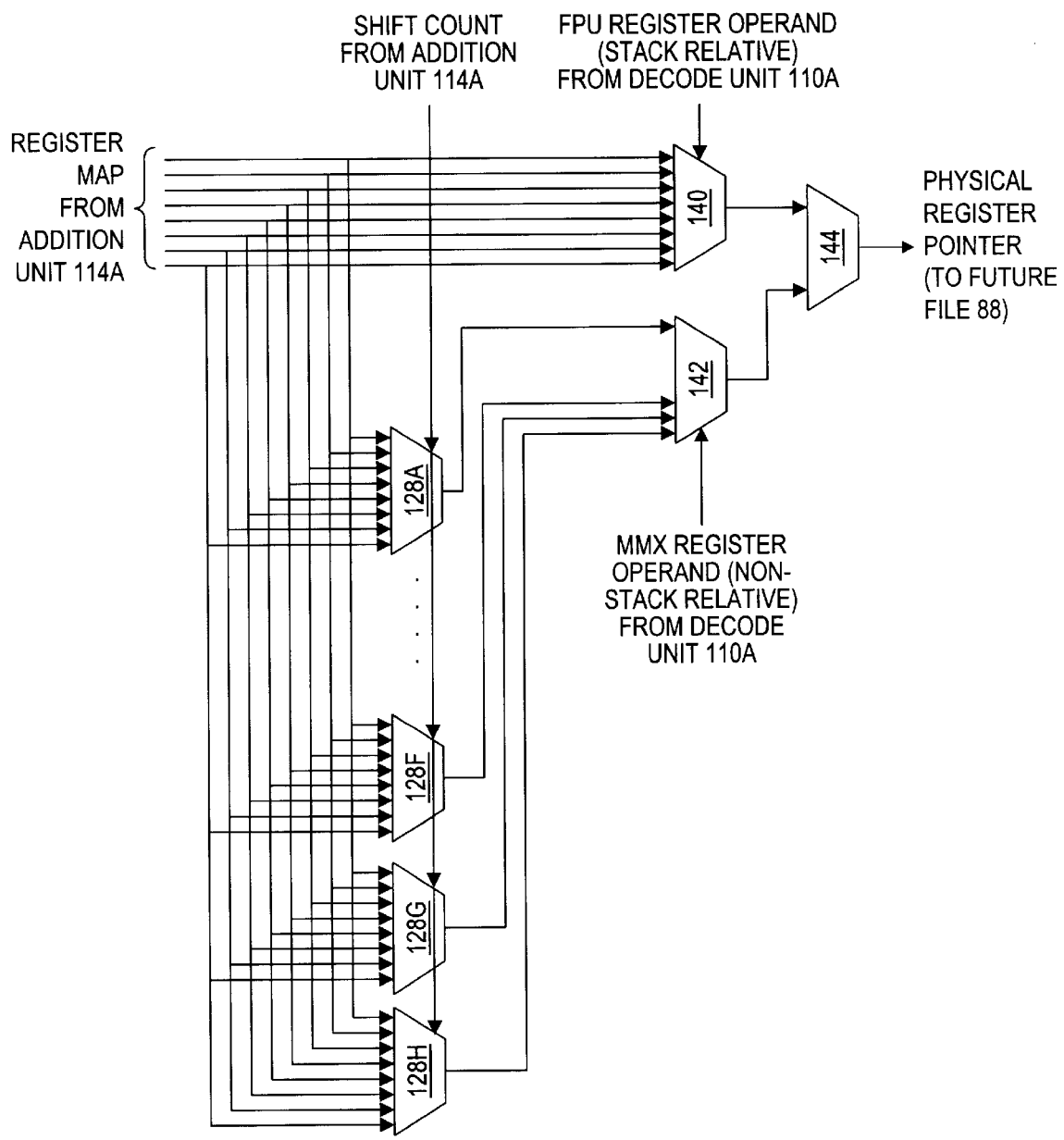
FIG. 6D, is a diagram showing details of one embodiment of the translation unit depicted in FIG. 4.

Turning now to FIG. 6D, details of one embodiment of translation unit 116A are shown. Translation unit 116A comprises a plurality of multiplexers 128A–128H, one for each pointer in register map 120. Multiplexer 140 receives register map 120 from addition units 114A–114C and selects the pointer that corresponds to a stack-relative operand (if there is one) for Instruction 1. However, as previously noted, MMX instructions directly address the FPU/MMX unit's physical registers. Therefore, multiplexers 128A–128H are used to shift the pointers in the register map back so that non-stack relative register operands may access the correct pointer. This is accomplished by shifting register map 120 back a number of positions equal to the shift count stored by addition units 114A–114C. Multiplexer 142 then receives the shifted register map 120 and selects the pointer that corresponds to the MMX (non-stack relative) register operand. Finally, multiplexer 144 selects the appropriate source or destination pointer (either stack-relative for FPU instructions or absolute for MM instructions) for output to future file 88.

Figure 6E:
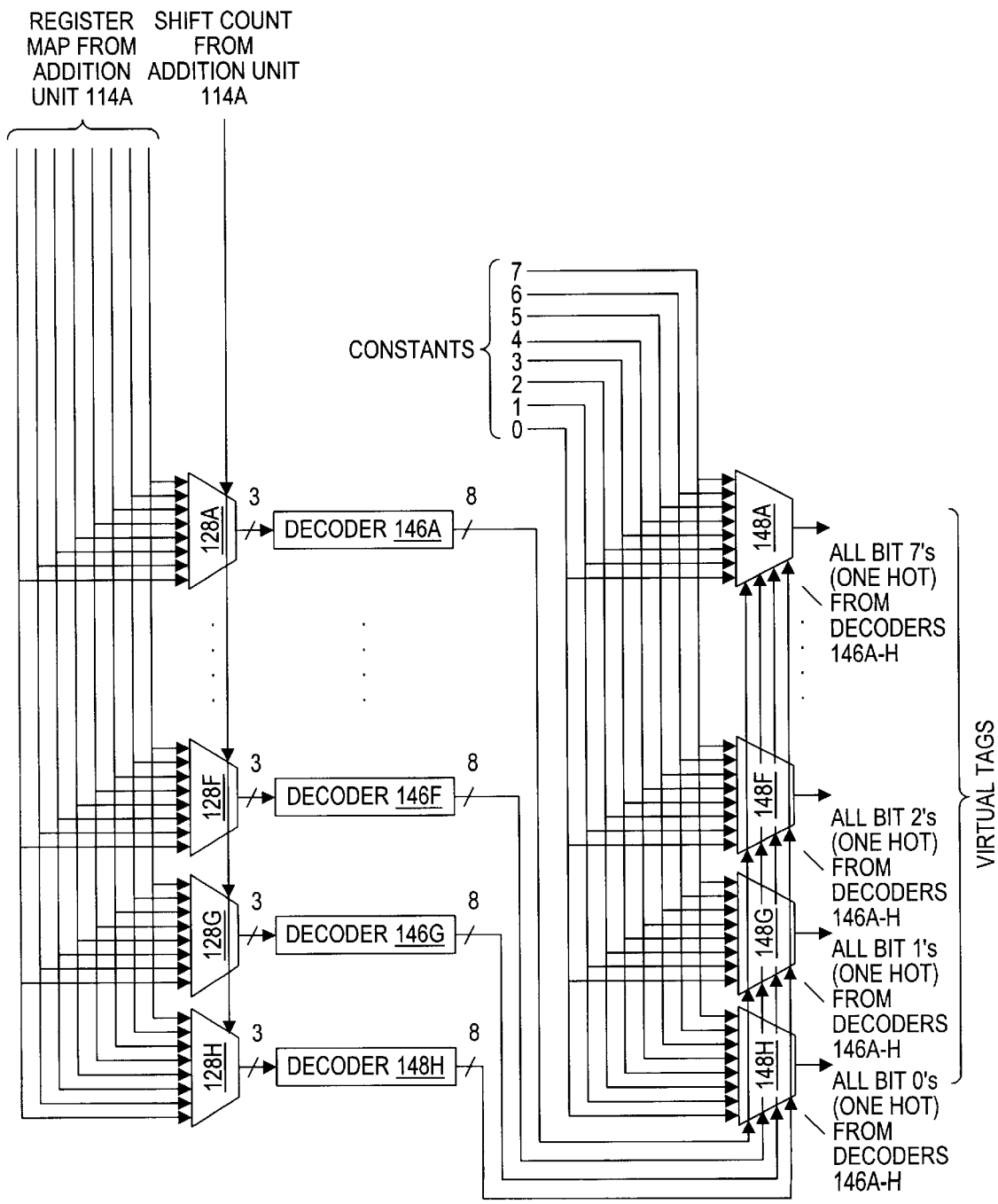
FIG. 6E, is a diagram showing details of another embodiment of the translation unit depicted in FIG. 4.

Turning now to FIG. 6E, details of another embodiment of translation unit 116A are shown. This embodiment of translation unit 116A comprises a plurality of multiplexers 128A–128H and 148A–148H, and a plurality of decoders 146A–146H. Multiplexers 128A–128H perform the same function as in the previously described embodiment of FIG. 6D, i.e., shifting the pointers in the register map. Decoders 146A–146H receive the three bit pointers and decode them into one hot encoded 8-bit wide format. Multiplexers 148A–148H select a particular constant based upon the relative location of the one hot encoded signal. For example, multiplexer 148H receives all the bit 0 signals from decoders 146A–146H. Thus, multiplexer 148H receives eight signal lines, one from each decoder 146A–146H. Only one of the eight signal lines is asserted. Multiplexer 148H selects a constant value for "virtual" tag 0 based upon the relative position of the asserted signal. A virtual tag is a pointer indicating which physical register is storing the data for a particular architectural register. This embodiment, unlike the embodiment shown in FIG. 6D, uses the same decoding method for both stack-relative and absolute register addressing. The virtual tags generated by translation unit 16A can be used by future file 88 in the next clock cycle (CLK3) to access the register storing the desired data. An example showing the functionality of this embodiment of translation unit 116A is described below.

Assuming the following register map as input, translation unit. 116A will output the following virtual tags:

| Pointer | Register Map Input (Shift Count = 1) | Output from Multiplexers 128A–128F | Virtual Tags |
|---|---|---|---|
| 7 | 5 | 7 | Virtual Tag 7 = 7 |
| 6 | 7 | 6 | Virtual Tag 6 = 6 |
| 5 | 6 | 3 | Virtual Tag 5 = 0 |
| 4 | 3 | 1 | Virtual Tag 4 = 1 |
| 3 | 1 | 0 | Virtual Tag 3 = 5 |
| 2 | 0 | 2 | Virtual Tag 2 = 2 |
| 1 | 2 | 4 | Virtual Tag 1 = 4 |
| 0 | 4 | 5 | Virtual Tag 0 = 3 |

Using the above virtual tags as an example, an instruction accessing architectural register 0 would use virtual tag 0 and access physical register 3. Similarly, an instruction accessing architectural register 3 would use virtual tag 3 and access physical register 5. The virtual tags may also be used for stack-relative accessing. For example, if TOS=1, then an instruction accessing the top of stack register would use virtual tag 1 to access physical register 4. A comparator may be used within future file 88 to access the data using virtual tag. Advantageously, both stack-relative and non-stack-relative register operands may use the same decoding method to read data from future file 88.

During the next clock cycle, CLK3, the three decoded instructions are written into central window 92 and their source and destination register pointers (which now point to physical registers) are used to access FPU future file 88. Future file 88 stores the current speculative contents for each of the eight physical registers 124A–124H in FPU/MMX unit 36. These speculative contents may either be values or tags for values that have not yet been calculated. The contents pointed to by the source and destinations register pointers are copied from future file 86 and written into central window 92.

In one embodiment, future file 88 comprises a series of eight multi-ported speculative registers, each of which is coupled to one of the eight corresponding physical registers 124A–124H. In another embodiment there are more than eight registers, one for each of the eight user-accessible registers and one for each non-user-accessible temporary register used throughout the FPU/MMX unit 36 pipeline. In one embodiment, each register in future file 88 is multi-ported to support up to six concurrent reads. This configuration supports concurrent access by the three instructions being stored into the central window 92 (up to two sources for each instruction).

Each register in future file 88 also has seven write ports. The first three write ports support concurrent access by the three instructions currently being issued. These ports are used to update future file 88. The next three write paths allow data from the result bus 100 (i.e., from add pipeline 94, multiply pipeline 96, and load/store pipeline 98) to be written into future file 88. The final write port is a restore path used to copy the contents of the eight physical registers 124A–124H which represent the actual current state (as opposed to the speculative current state) into future file 88 when a branch misprediction or exception occurs. Advantageously, the multi-ported structure may allow future file 88 to be accessed, read from, and written to all in a single clock cycle.

Figure 7:
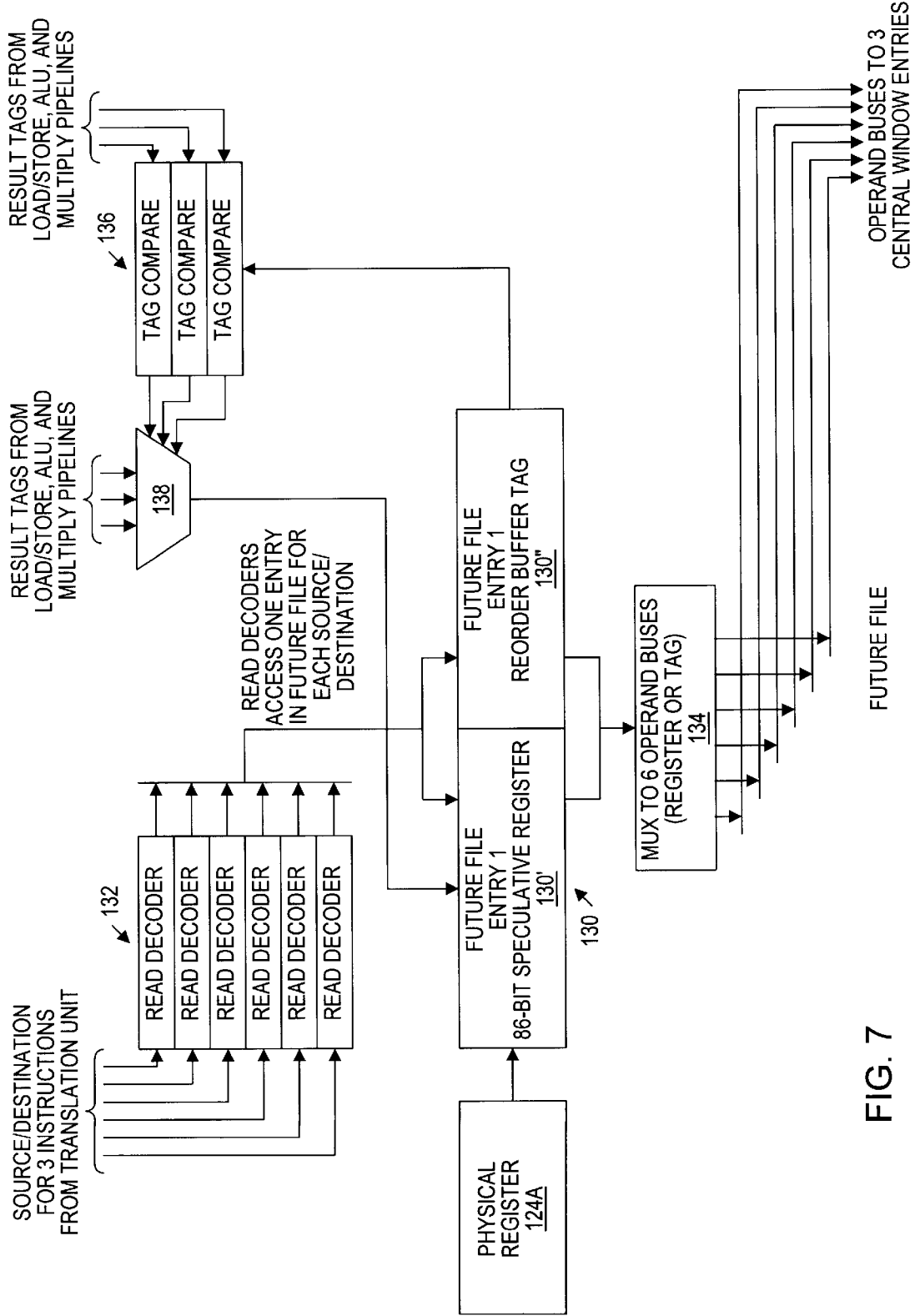
FIG. 7 is a block diagram showing one embodiment of the future file depicted in FIG. 3.

Turning now to FIG. 7, detail of a register within future file 88 is illustrated. Register 130 comprises two fields, one field 130' for storing the speculative contents of a corresponding physical register 124A, and one field 130" for storing a reorder buffer tag if the speculative contents are unavailable. Source and destination pointers for each of the three instructions are input to read decoders 132, which select which of the eight registers within future file 88 correspond to the requested operand. Similarly, multiplexer 134 matches the appropriate register with the appropriate operand bus to convey the speculative contents of the register to central window 92.

When a result becomes available upon result bus 100, tag compare unit 136 compares the result tag with the reorder buffer tags stored in register 130. If there is a match, the results are selected using multiplexer 138 and stored into the speculative contents field 130' of register 130. This process updates the speculative state of future file 88.

Branch Misprediction and Exception Recovery

When a branch misprediction or exception is detected, the speculative state is rebuilt. Future file 88 is rebuilt by copying the values from the physical registers 124A–124H as described above. The TOS and associated register mapping are also rebuilt starting with the mispredicted branch or exception causing instruction.

In one embodiment, branch misprediction recovery is implemented by stalling the FPU/MMX pipeline at the decode stage (i.e., during CLK1) until the branch mispredict has been retired and the correct architectural state has been restored. This prevents the new instruction stream from accessing the speculative TOS until the correct architectural state has been restored. Entries in central window 92 or result queue 90 that are still pending when a branch misprediction is retired are locally canceled when the branch misprediction is signaled. Advantageously, this embodiment may perform well if the FPU/MMX instructions being processed by FPU/MMX unit 36 tend to be long in line code and predicted correctly, or use conditional operations in place of branches.

In another embodiment of FPU/MMX unit 36, the new instruction stream following the branch misprediction or exception proceeds down the FPU/MMX pipeline using the current speculative TOS values without waiting for the correct TOS to be rebuilt. After the instructions are stored in central window 92, any instructions that require a corrected TOS are passed through the translation unit 86 again. Advantageously, this embodiment may improve branch misprediction recovery speed if the misprediction did not affect the TOS.

Figure 8:
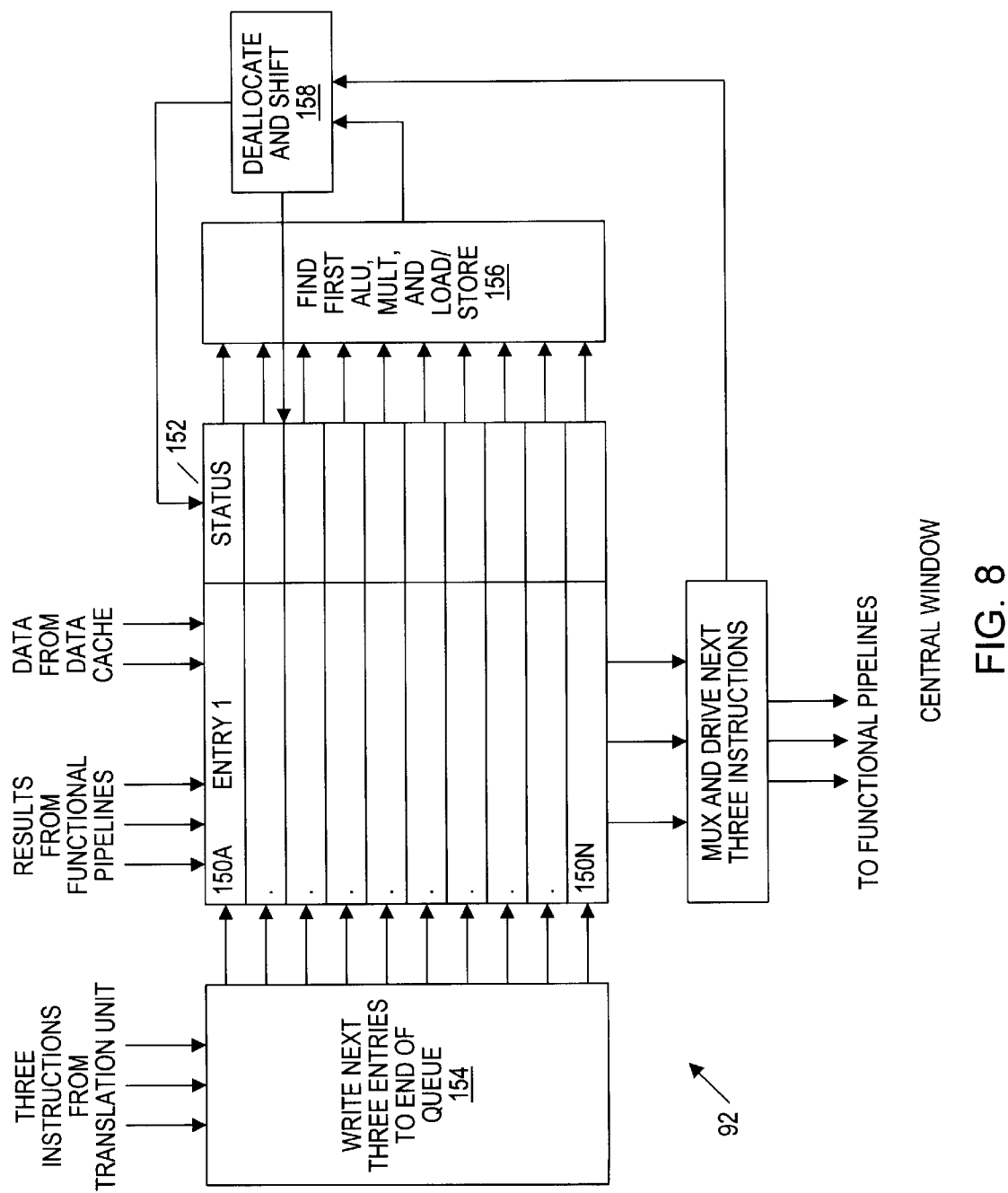
FIG. 8 is a block diagram depicting one embodiment of the central window shown in FIG. 3.

Turning now to FIG. 8, a block diagram of one embodiment of central window 92 is shown. Central window 92 is where all FPU/MMX multiply, ALU, add, and load/store operations are held until they are ready to be issued to functional pipelines 94–98. Each central window entry 150A–150N is composed of the decoded instruction and type, the source and destination values or tags, the instruction's reorder buffer tag, and a status field 152. Central window 92 is configured to allocate and retire up to three entries per clock cycle. Central window 92 is configured as a shiftable/collapsible FIFO, much like result store unit 26. Selection unit 154 allows each entry 150A–150N to be loaded from any of the three issue positions, and each entry 150A–150N is capable of issuing to any of the three instruction data paths 94–98. Each entry 150A–150N is able to independently shift 0, 1, 2, or 3 positions in a single clock cycle. Advantageously, this ability to shift may allow the remaining entries to fill in the gaps created by an instruction that is issued out of order. Issue unit 156 searches the contents of central window 92 to find the first instruction ready to be issued to each of the three functional pipelines 94–98. While instructions may be executed out of order, preference is given to the oldest instructions outstanding in the central window 92. Once an instruction is issued to the appropriate functional pipeline 94–98, deallocation unit 158 clears the status field of the entry, thereby indicating that the entry is available to store a new instruction. Deallocation unit 158 also controls the shifting of the entries to fill in any gaps. Advantageously, the vacated entries may be ready to be filled when the next clock cycle occurs.

Figure 9:
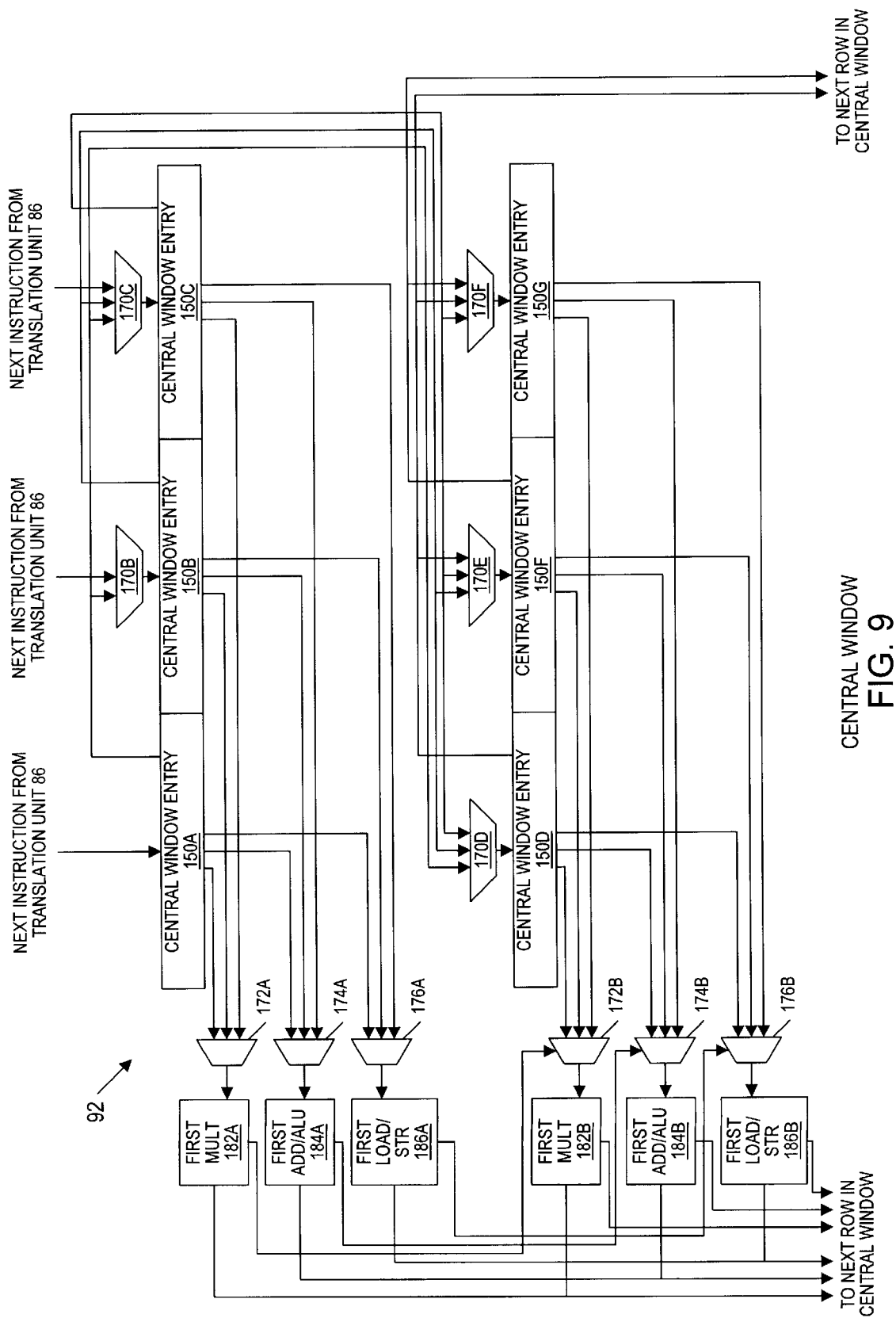
FIG. 9 a block diagram depicting details of one embodiment of the central window shown in FIG. 8.

Turning now to FIG. 9, detail of the first six entries in one embodiment of central window 92 are shown. Central window 92 is configured into rows, each row having three entries. Each entry in the first row (i.e., entries 150A–150C) is capable of receiving instructions directly from translation unit 86 and operands from future file 88. Up to three instructions may be written per clock cycle. As previously explained, central window operates as a FIFO-like manner, with instructions stored in entries 150A–150N propagating through each line of central window until being selected for issue to the functional pipelines 94–98. Unlike a FIFO, however, the contents of any entry can be issued, even if there are other instructions before and after it in central window 92. Multiplexers 170B–170F, which are part of selection unit 154, allow entries to be shifted towards the bottom of central window 92, thereby filling in any gaps created when an instruction is issued. Each entry's contents are capable of shifting up to three positions in a clock cycle. For example, the contents of entry 150A can shift to entry 150B (via multiplexer 170B), entry 150C (via multiplexer 170C), or entry 150D (via multiplexer 170D).

Multiplexers 172A–176B and issue sub-units 182A–186B are part of issue unit 156, and operate to select and issue up to three instructions each clock cycle, i.e., one for each of the functional pipelines 94–98. Multiplexers 172A–B and issue sub-units 182A–B select the oldest instruction ready to be issued to multiplication functional pipeline 96. Similarly, multiplexers 174A–B and issue sub-units 184A–B select the oldest instruction ready to be issued to addition/ALU/shifting/MMX functional pipeline 94. An instruction is ready to issue when all operand dependencies have been resolved. While only six entries 150A–150F are shown in FIG. 9, more entries are contemplated. In addition, while the embodiments illustrated show three functional pipelines 94–98 and three decode/issue pipelines, other numbers are possible.

Figure 10:
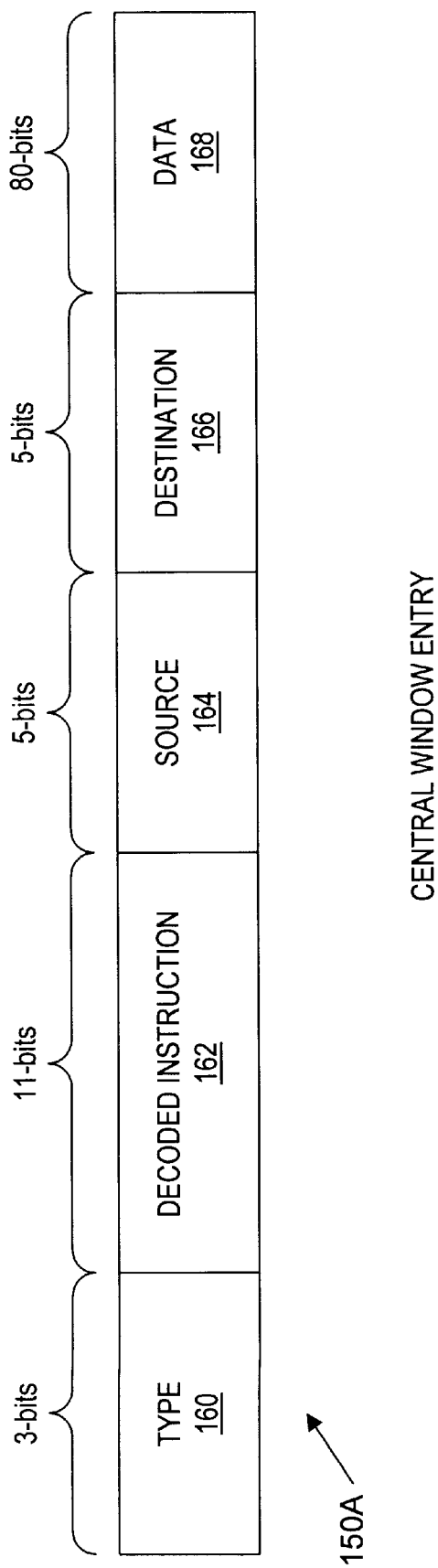
FIG. 10 is a block diagram of one embodiment of an entry in the central window shown in FIG. 9.

Turning now to FIG. 10, a detailed diagram of one embodiment of an entry in central window 92 is shown. Each entry 150A–150N comprises five separate fields: an instruction type field 160, a decoded instruction field 162, source and destination operand fields 164 and 166, and data field 168. As previously noted, a status field 152 (see FIG. 8) is also associated with each entry. The status field 152 may indicate the status of the entry, for example, whether an entry is to be loaded (new instruction coming), validated (results have come back), or invalidated Oust sent to functional pipeline).

Figure 11:
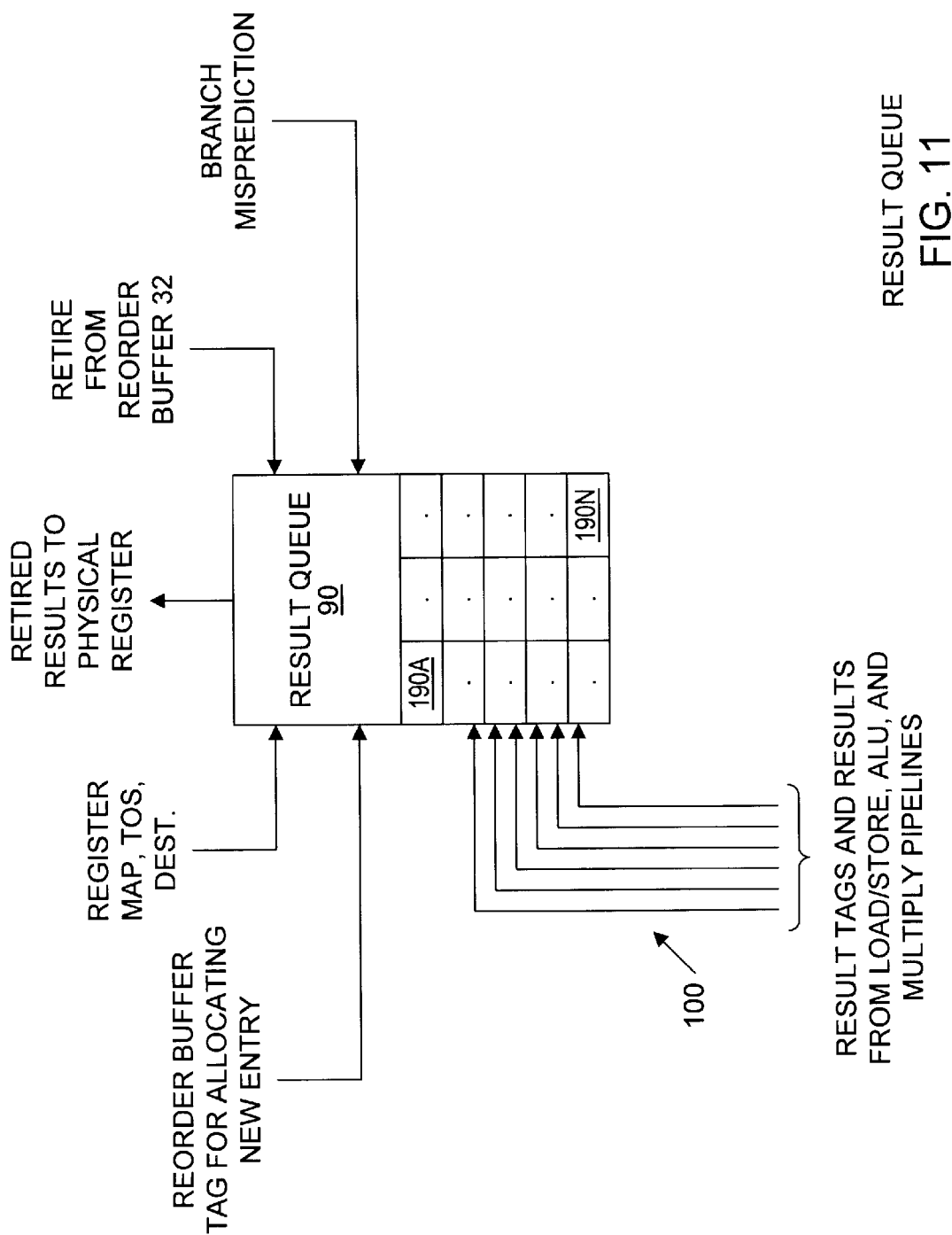
FIG. 11 is a block diagram showing one embodiment of the result queue depicted in FIG. 3.

Turning now to FIG. 11, details of one embodiment of result queue 90 are shown. Result queue 90 comprises a number of storage locations 190A–190N. In parallel with the decoding and writing of instructions into central window 92, one of storage locations 190A–190N within result queue 90 is reserved for each instruction by writing the instruction's reorder buffer tag into a particular storage location. When the instruction's TOS and register map are available from translation unit 86, these are also stored in result queue 90 with the reorder buffer tag. Result queue 90 receives the reorder buffer tags from early decode units 40A–40C.

Once an instruction has completed execution in functional pipelines 94–98, the results and result tag are received upon result bus 100 and stored in result queue 90 and future file 88 into storage locations having a matching reorder buffer tag. Result queue 90 stores the results until it receives a retire signal from reorder buffer 32, at which time the results are written to the FPU's physical registers 102. The instruction's TOS and register map are also stored to status registers that are a part of the FPU's physical registers 102. This effectively updates the current non-speculative state of FPU/MMX unit 36. Finally, the storage location within result buffer 90 is cleared using valid bit 200. In the event of a branch misprediction, result queue 90 uses valid bit 200 to clear any locations storing reorder buffer tags for instructions that occurred after the mispredicted branch instruction in program order.

In one embodiment, result queue 90 is configured to store a total of 45 entries in 15 lines with three positions each.

Storage locations are allocated and deallocated in aligned three instruction groupings. The result queue's structure and function is similar to that of reorder buffer 32, but result queue 90 does not forward data from its entries. Instead, its entries are maintained as storage for retiring architectural states, indication of exceptions, and branch misprediction/exception recovery.

Figure 12:
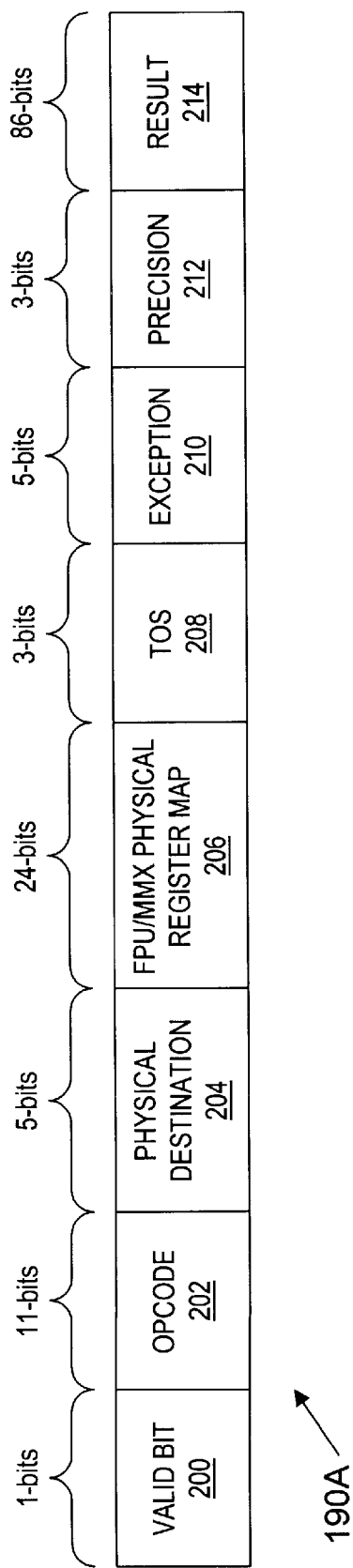
FIG. 12 is a block diagram of one embodiment of an entry in the result queue shown in FIG. 11.

Turning now to FIG. 12, detail of one embodiment of storage location 190A within result queue 90 is shown. Storage location 190A comprises a valid bit field 200, an 11-bit opcode field 202, a 5-bit physical destination pointer field 204, a 24-bit register map field 206, a 3-bit TOS field 208, a 5-bit exception field 210, a 3-bit precision field 212, and an 86-bit result field 214.

Result queue 90 may be implemented as a multi-ported SRAM array. Note that while a total of four writes (i.e., reorder buffer tag, TOS and register map, and three results) and one read (by FPU physical registers 102 upon a retire signal from reorder buffer 32) are performed every clock cycle to result queue 90, the individual SRAM cells may be optimized by using less than five ports per cell. This is possible because each of the five accesses does not access every field within a particular result queue entry. For example, when entries are allocated within result queue 90, only the following fields are written to: the 4-bit TOS field 208, the valid bit field 200, the 5-bit physical destination register field 204, the 11-bit opcode field 202, and the 24-bit register map field 206. Similarly, when results are written to result queue 90, only the 86-bit result field 214, the 5-bit exception field 210, and the 3-bit precision field 212 are written to. Thus, some SRAM cells may only require two ports and others may only require 4 ports, even though up to four write accesses and one read access are performed each clock cycle. In one embodiment, result queue 90 may be configured as a shared queue for both integer and floating point instructions if reorder buffer 32 is replaced with a result queue/future file combination similar to result queue 90 and future file 88.

In the normal retire sequence, up to three entries from result queue 90 may be written back at one time into physical registers 102. If multiple instructions write to the same register, the results of the last instruction in program order (i.e., the instruction having the largest issue position) is the one written to the register. The three instructions may be checked for multiple writes to the same register at the beginning of the retire clock cycle.

Figure 13:
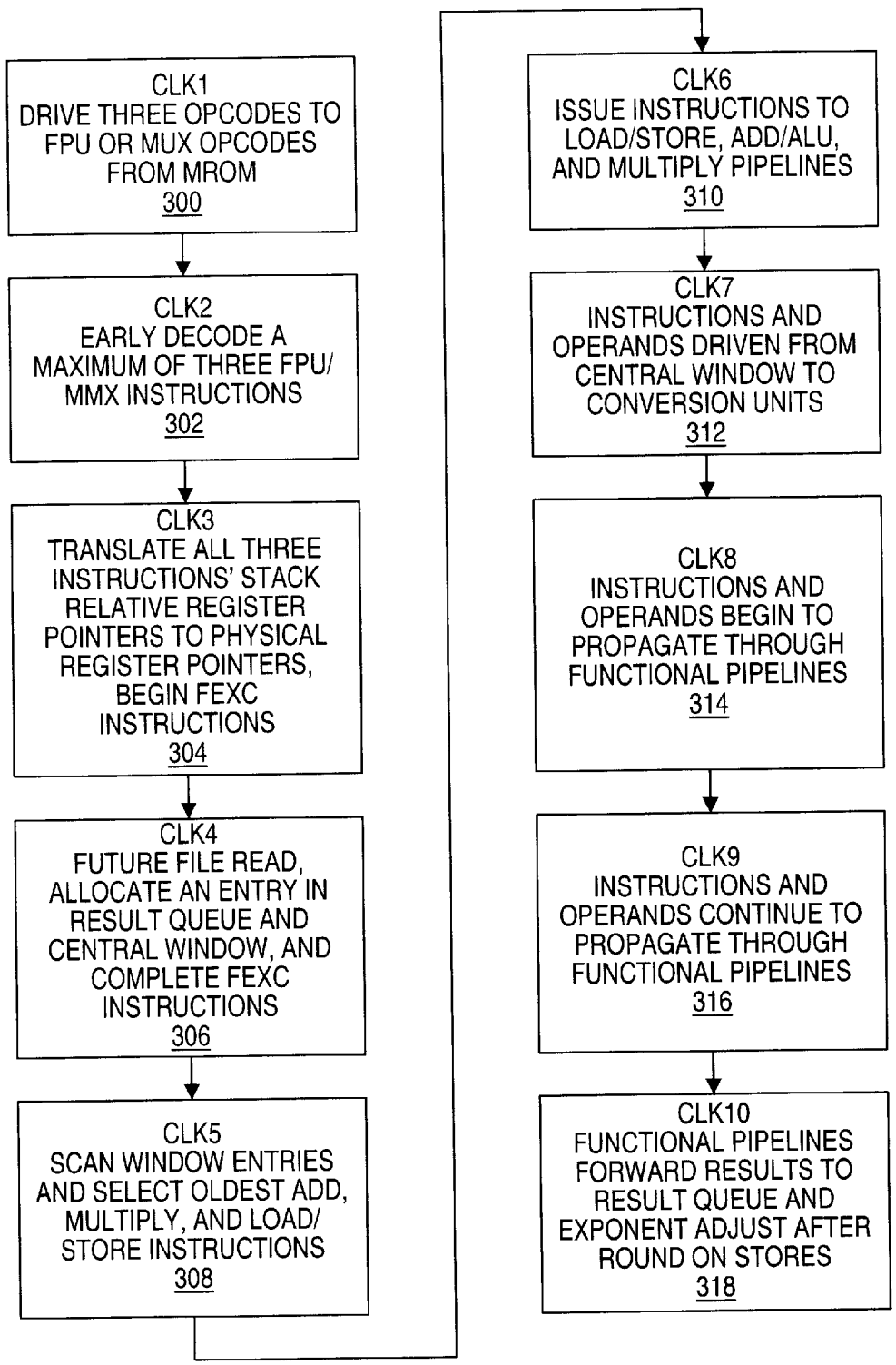
FIG. 13 is a flowchart depicting one embodiment of the relative timing of the FPU/MMX unit shown in FIG. 4.

Turning now to FIG. 13, a flowchart depicting one embodiment of the relative timing of FPU/MMX unit 36 is shown. During CLK1 300, up to three opcodes are sent to decode units 110A–110C. During CLK2 302, decode units 110A–110C decode the three instructions. During CLK3 304, translation unit 86 translates all three instructions' stack relative register pointers to physical register pointers. Also during CLK3 304, register stack manipulation instructions (e.g., FEXC) are performed using register map 120. During CLK4 306, the instructions are sent to central window 92, future file 88 is accessed, a storage location within result queue 90 is allocated, and register stack manipulation instructions are completed by storing the register map into result queue 90 (effectively bypassing central window 92 and functional pipelines 94–98).

During CLK5 308, the entries within central window 92 are scanned to select the next three instructions to issue to functional pipes 94–98. Since there can be a number of entries in central window 92, one entire clock cycle is allocated to scan, select and enable up to three speculative instructions.

During CLK6 310, the selected instructions are sent to the input flip-flops of functional pipelines 94–98 to begin execution. The physical shifting of the array takes one clock cycle. In one embodiment, the central window entries 150A–150N are collapsed before the scan is started.

In parallel, the selected instructions are checked for denormalized numbers, infinites, and other end case operands. Also in parallel, operands for load-op instructions are loaded directly to central window 92 from data cache 28 or main memory. Thus, 32-bit, 64-bit, and 80-bit loads are expanded to the internal 86-bit format during CLK6 310. For most cases, this simply involves extracting the exponent and mantissa and padding the least significant bits with zeros, but for numbers that are not representable in an internal format, the pipeline is stalled while the numbers are converted through a sequence of shift and subtracts on the mantissa and exponent, respectively. If this is the case, a pipeline stall occurs on the next issue until all three instructions have operands that their respective pipelines can handle. This normalization process is described in greater detail below.

During CLK7 312, the operands are driven to conversion units 352A–352C by central window 92. Conversion units 352A–352C convert the operands to internal format. The internal format operands and the instruction opcodes are then routed to functional pipelines 94–98. Normalization units 350A–350C monitor the output of conversion units 352A–352C and are configured to detect and capture any denormal operands. Captured denormal operands are normalized and then routed to functional pipelines 94–98. Normalization may take several clock cycles and is described in greater detail below. In one embodiment, FPU/MMX unit 36 is configured to stall the issue of instructions to functional pipelines 94–98 until normalization is complete. During CLK8 314, the three selected instructions and operands begin their execution in instruction pipelines 94–98. Each instruction may take multiple clock cycles (e.g., CLK8 314 through CLK9 316) to complete execution depending upon the complexity of the operation being performed. After execution (e.g. CLK10 318), the results are written to central window 92, future file 88, and result queue 90 as necessary. When reorder buffer 32 indicates that an instruction should be retired, the results in result queue 90 are written to the FPU's physical registers 102, thereby updating the actual state of the FPU/MMX unit 36 and microprocessor 10.

Expansion of operands to internal 86-bit format

As previously noted, during CLK7 register operands are driven by central window 92 and memory operands are translated and normalized. In addition to data movement of operands, virtual tags, decoded instructions, and rounding/precision control, the 32-bit/64-bit/80-bit load values that were stored in the source and destination operand fields 164 and 166 of the central window 92 for load or load-op types of operations are also moved. These operands must be expanded at the central window 92 to the internal 86-bit format before driving the operand buses.

Figure 14:
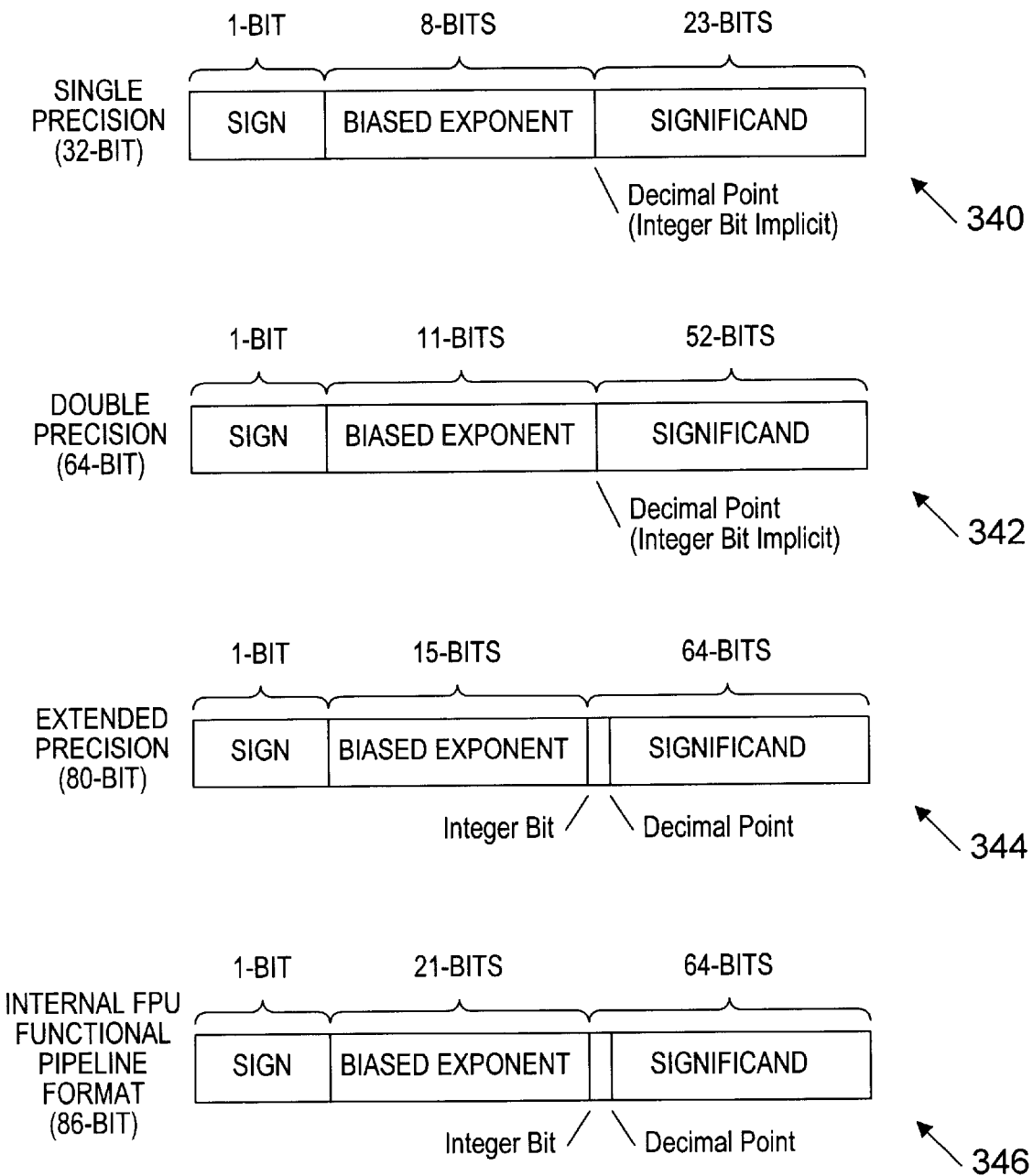
FIG. 14 is a diagram depicting one embodiment of the formats used to represent floating point values in the FPU/MMX unit shown in FIG. 4.

Turning now to FIG. 14, diagrams of each of the data formats used by FPU 36 are shown for one embodiment of FPU 36. Floating point numbers, whether they are single precision 340, double precision 342, or extended precision 344, are converted to internal 86-bit format when they are transmitted to functional pipelines 94–98. Advantageously, this internal format may allow for more efficient calculation in functional pipelines 94–98. Load operands are written directly to central window 92 in the same format the data is received from memory. For example, if a single precision memory operand is loaded to a particular register in the stack via the FLD instruction, and a subsequent FADD instruction accesses that particular register as a source operand, the 32 bits of data loaded from memory are stored into source field 164 within the central window entry in the 32-bit single precision format 340. When the FADD instruction is selected from central window 92 for issue to the addition functional pipeline 94, multiplexers are used to translate the 32-bit single precision format data into the internal 86-bit format 346. This configuration advantageously bypasses the typical bus conversion process performed when a memory operand is returned from memory.

Figure 15:
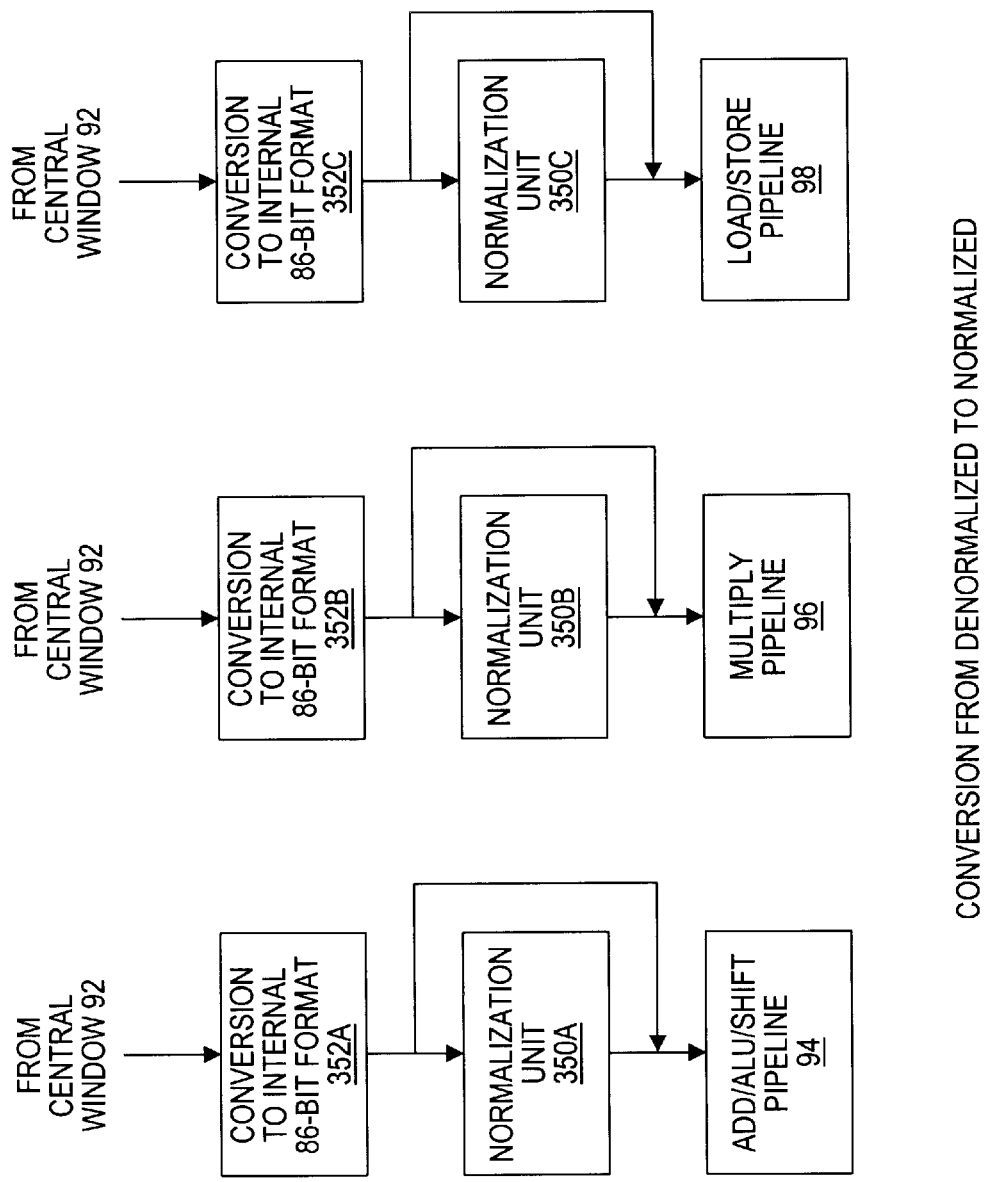
FIG. 15 is a block diagram depicting one embodiment of the conversion units and translation units used by the FPU/MMX unit shown in FIG. 3 to convert values to an internal format.

Turning now to FIG. 15, one embodiment of the process used to convert operands to the internal 86-format 344 before reaching functional units 94–98 is shown. Operands are routed from central window 92 to one of three conversion units 352A–352C. Each conversion unit is dedicated to a particular functional pipeline. Conversion units 352A–352C are coupled between central window 92 and normalization units 350A–350C. Conversion units 352A–352C receive the operands in the format they were stored in central window 92 and convert them to internal 86-bit format 346.

Normalization units 350A–350C receive the internal 86-bit format operands from conversion units 352A–352C and check for denormnals, infinites, and other end case operands. A number is denormalized when it has a biased floating point exponent of zero and a zero integer bit. Denormal numbers are numbers that are too small to represent within the source floating point format. In the event that a denormalized operand is detected, a stall signal is issued to central window 92 and the operand is normalized by normalization units 350A–350C.

Figure 16:
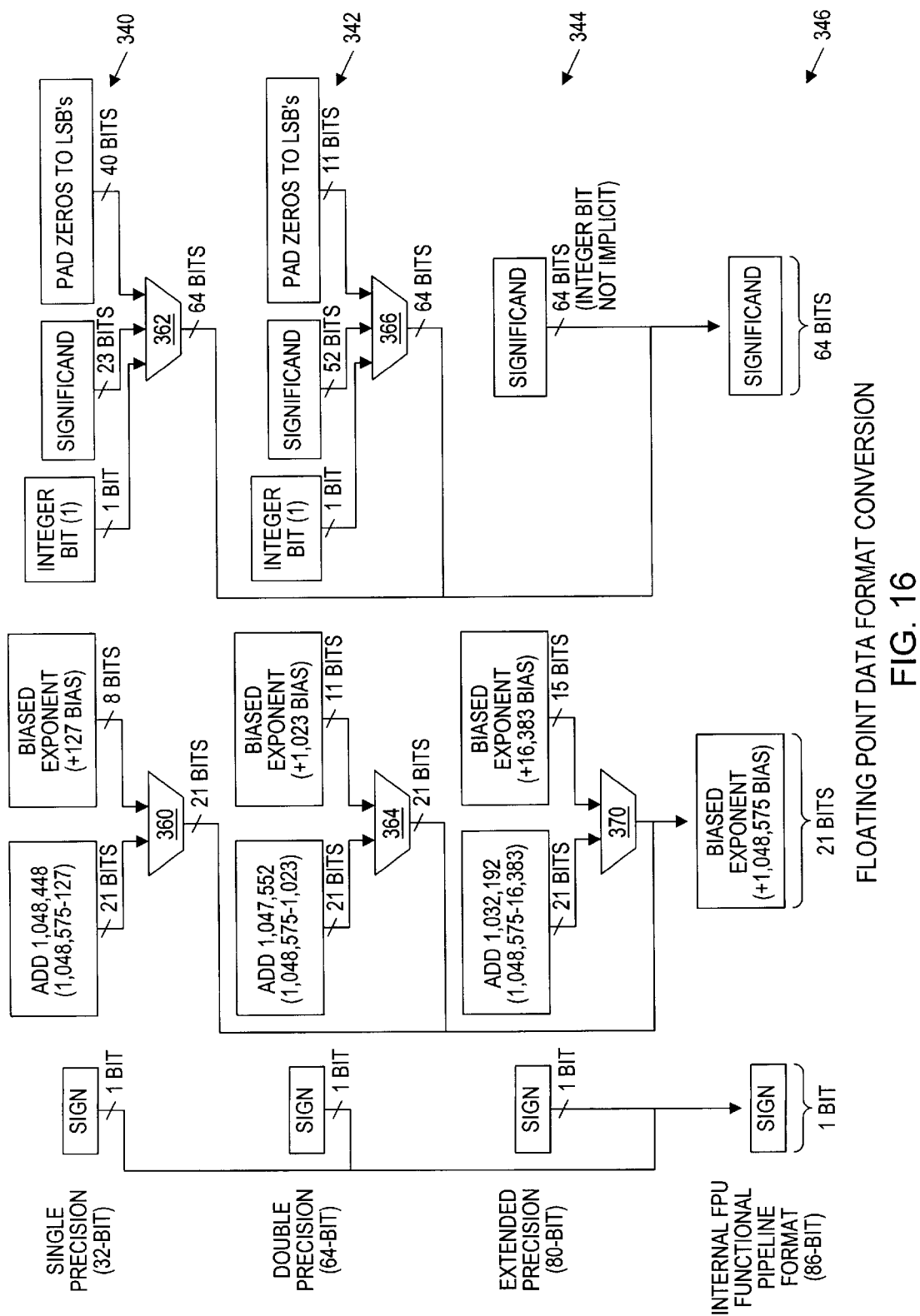
FIG. 16 is a diagram illustrating one embodiment of the conversion unit depicted in FIG. 15.

Turning now to FIG. 16, one embodiment of conversion units, 352A–352C is shown. Conversion units 352A–352C operate by padding a varying number of zeros into the least significant bits ("lsb") of an operand's significand (if necessary) and adding a constant to the operand's exponent. For a single precision operand 340 and a double precision operand 342, an integer bit is also added. This is not necessary for the extended precision operand 344 because the extended format has an explicit integer bit. Multiplexers 362 and 368 combine the significands, the integer bits, and the padding zeros together to form the integer significand.

The exponents are converted to internal format 346 by adding a constant. Adders 360, 364, and 370 perform the addition. The value of the constant to be added is determined by subtracting the desired bias of the exponent in its final format from the bias of the exponent's original format. Note the internal format shown may be changed, for example, a 20-bit exponent with a 70-bit significand. In addition, other biases are also possible.

Figure 17:
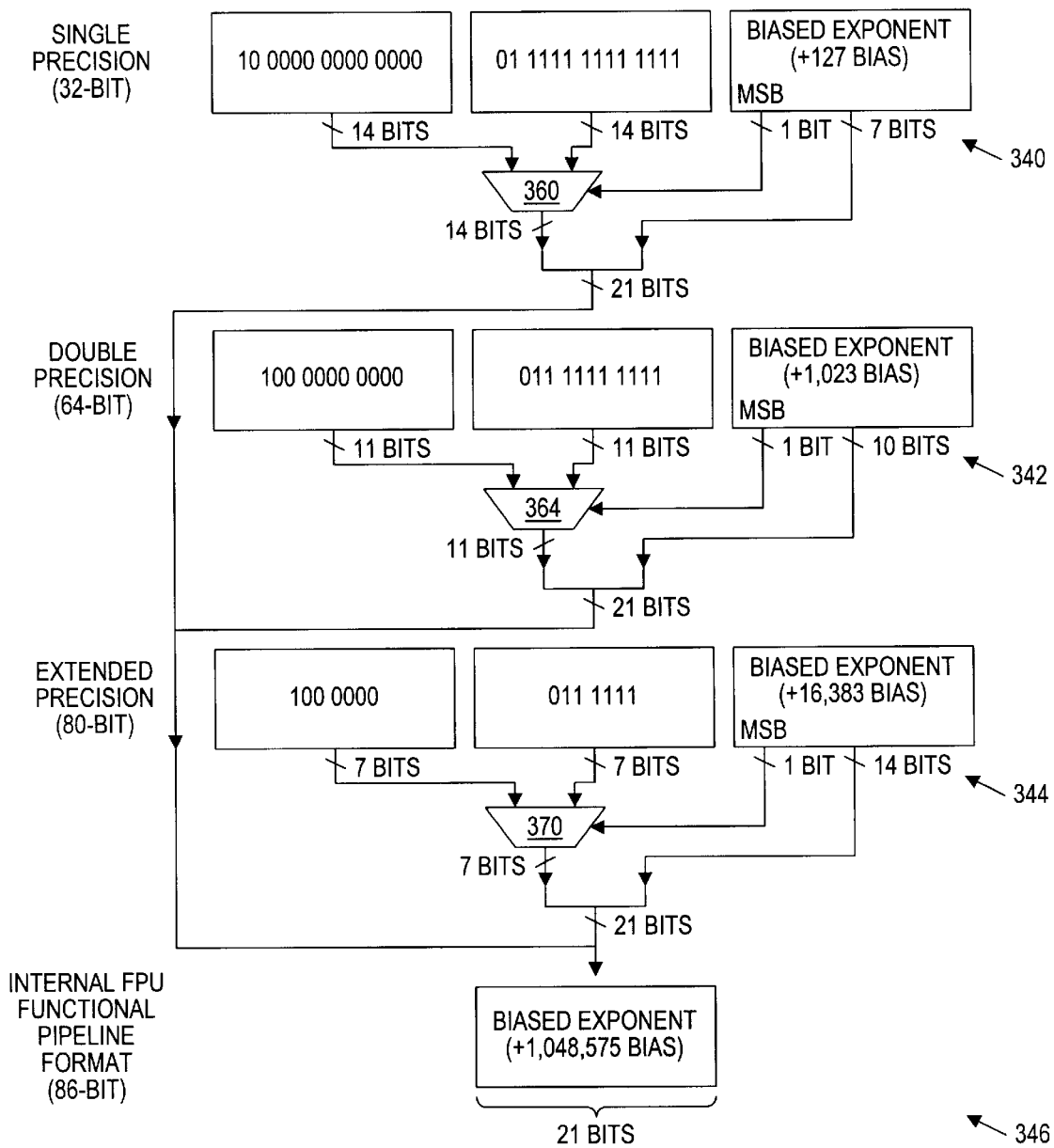
FIG. 17 is a diagram detailing the conversion unit depicted in FIG. 15.

As illustrated in FIG. 17, adders 360, 364, and 370 may be implemented as multiplexers. For example, when converting an exponent in single precision format 340, adder 360 functions as a multiplexer by selecting one of two constants based upon the value of the most significant bit of the single precision format exponent. The constant is then concatenated with the remaining lesser significant bits of the exponent to form the internal format exponent. Advantageously, a multiplexer configuration such as the one illustrated in FIG. 17 may advantageously perform the conversion in a shorter period of time.

Figure 18:
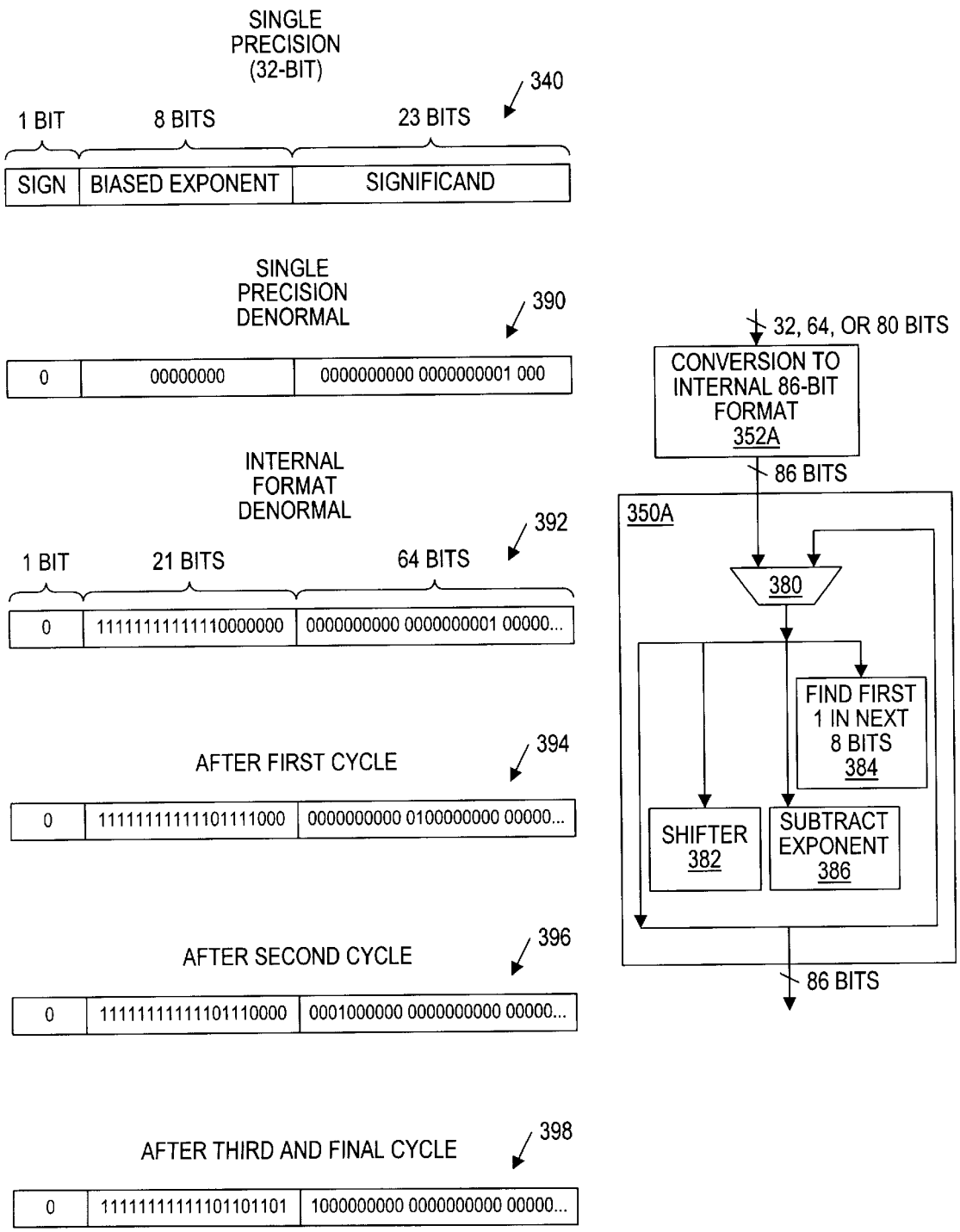
FIG. 18 is a diagram showing details of one embodiment of the normalizations unit depicted in FIG. 15.

Turning now to FIG. 18, one embodiment of normalization unit 350A is shown. Normalization unit 350A operates by shifting the denormal operand's significand by small amounts which are subtracted from the denormal operand's exponent. Shifter 382 performs the shifting function on the significand, while subtraction unit 386 subtracts the corresponding shift amount from the exponent. The output of shifter 382 and subtraction unit 386 are fed back through normalization unit 350A by multiplexer 380 until a one is detected in the integer bit of the significand.

The operation of normalization unit 350A can be illustrated using exemplary single precision operand 390 in single precision format 340. First, the operand is expanded to an 86-bit internal format 392 by conversion unit 352A. Then the operand is conveyed to normalization unit 350A. During the first pass through normalization unit 350A, the operand's significand is shifted by eight bits and the shift amount is subtracted from the operand's exponent as represented by intermediary value 394. During the second pass through normalization unit 350A, intermediary value 394 is shifted by another eight bits as represented by value 396. During the third pass and final pass through normalization unit 350A, intermediary value 396 is shifted by another three bits, thereby normalizing the operand as represented by value 398. Other functional unit source operands that have normalized inputs may continue to move through the functional pipelines, but issue is held (for simplicity) until all three functional pipelines 94–98 have issued and completed CLK6 and started execution in CLK7.

Figure 19:
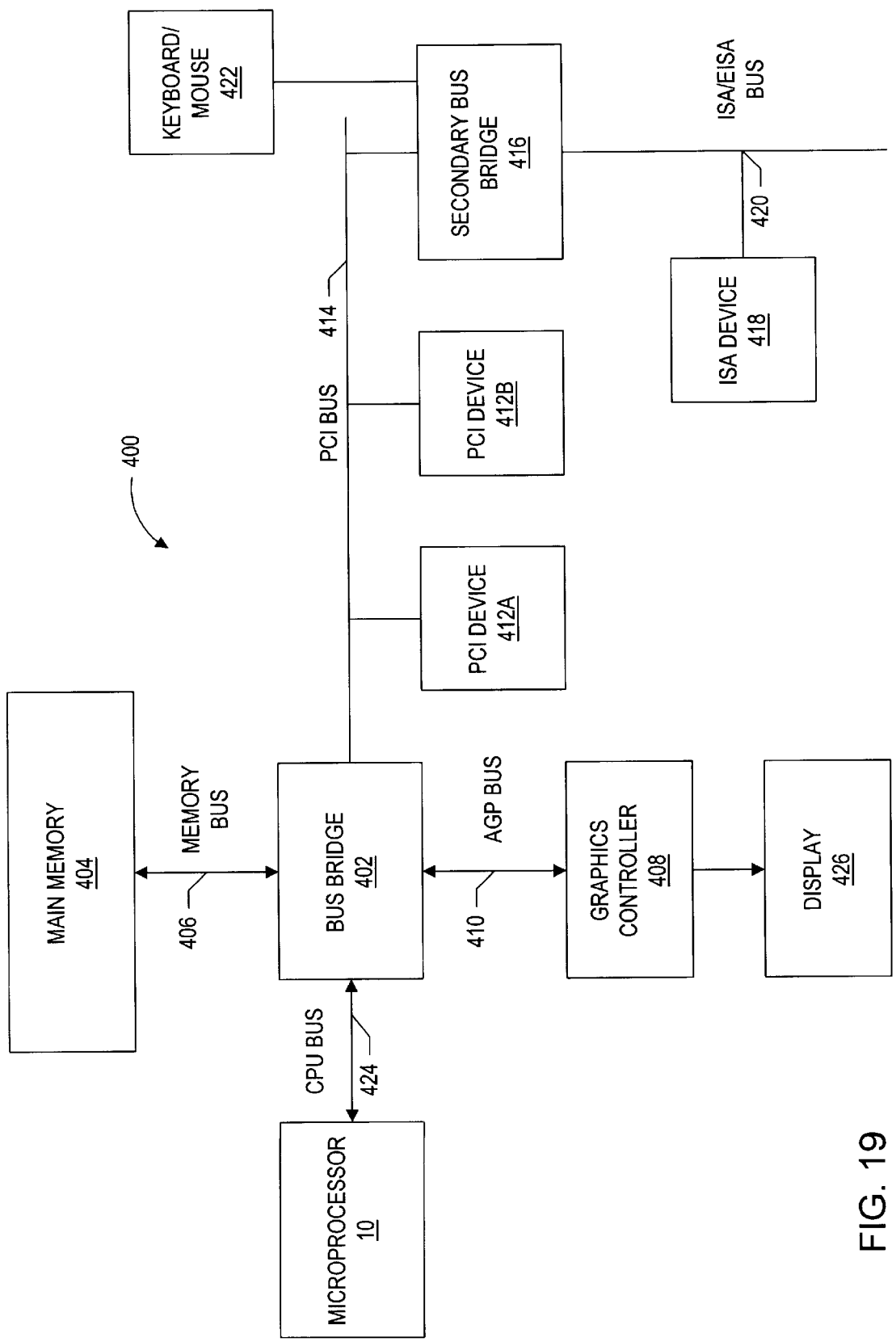
FIG. 19 is a block diagram of one embodiment of a computer system configured to utilize the microprocessor of FIG. 1.

Turning now to FIG. 19, a block diagram of one embodiment of a computer system 400 including microprocessor 10 coupled to a variety of system components through a bus bridge 402 is shown. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynarnic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc. It is noted that, while the AGP, PCI, and ISA or EISA buses have been used as examples in the above description, any bus architectures may be substituted as desired.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
| --- | --- |
| AAA | MROM |
| AAD | MROM |
| AAM | MROM |

TABLE 1-continued x86 Fast Path, Double Dispatch, and MROM Instructions

| X86 Instruction | Instruction Category |
| --- | --- |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| EMER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |

TABLE 1-continued x86 Fast Path, Double Dispatch, and MROM Instructions

| X86 Instruction | Instruction Category |
| --- | --- |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note: Instructions including an SIB byte are also considered double dispatch instructions.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

What is claimed is:

1. A method for operating a microprocessor comprising:
   decoding two or more instructions;
   using a different selection logic unit to generate a different register map for each of the instructions;
   translating stack-relative register references in the instructions to physical register pointers using the different register maps;
   reading a future file using the physical register pointers;
   allocating an entry in a result queue for each instruction;
   allocating an entry in the central window for each instruction; and
   executing any register exchange instructions by swapping register pointers within one or more of the different register maps.

2. The method as recited in claim 1, wherein the different register maps are generated during the same clock cycle.

3. The method as recited in claim 2, wherein each of the different register maps is generated taking into account changes in register stack order caused by previous instructions.

4. The method as recited in claim 3, wherein the different register maps are generated by multiplexing pointers from a previously stored register map.

5. The method as recited in claim 2, wherein a first of the different register maps is generated by routing a previously stored register map through a first selection logic unit, and wherein a second of the different register maps is generated by routing the first of the different register maps through a second selection logic unit.

6. The method as recited in claim 2, further comprising the last of the different register maps for a next plurality of instructions.

7. A microprocessor comprising:
   a reorder buffer; and
   a floating point unit coupled to said reorder buffer, wherein said floating point unit comprises:
   a plurality of registers configured as a stack,
   a plurality of storage locations, each configured to store a pointer to one of said registers,
   a first plurality of selection logic units, wherein each selection logic unit in said first plurality of selection logic units is configured to select a particular storage location for output according to a first decoded instruction; and a second plurality of selection logic units, wherein each selection logic unit in said second plurality of selection logic units is configured to select one of said outputs according to a second decoded instruction, wherein the contents of said plurality of pointer storage locations define a first order of said register stack, wherein the outputs of said first plurality of selection logic units define a second order of said register stack, and wherein the outputs of said second plurality of selection logic units define a third order of said register stack.

8. The microprocessor as recited in claim 7, wherein said selection logic units comprise multiplexers.

9. The microprocessor as recited in claim 7, wherein said selection logic units comprise read-only memories.

10. The method as recited in claim 7, wherein the first plurality of selection logic units generates a first register map, and wherein the second plurality of selection logic units generate a second register map.

11. A computer system comprising:

a main memory, a microprocessor, and a bus bridge coupling the main memory and the microprocessor, wherein the microprocessor comprises:

a reorder buffer; and a floating point unit coupled to said reorder buffer, wherein said floating point unit comprises:

a plurality of registers configured as a stack, a plurality of storage locations, each configured to store a pointer to one of said registers, a first plurality of selection logic units, wherein each selection logic unit in said first plurality of selection logic units is configured to select a particular storage location for output according to a first decoded instruction; and a second plurality of selection logic units, wherein each selection logic unit in said second plurality of selection logic units is configured to select one of said outputs according to a second decoded instruction, wherein the contents of said plurality of pointer storage locations define a first order of said register stack, wherein the outputs of said first plurality of selection logic units define a second order of said register stack, and wherein the outputs of said second plurality of selection logic units define a third order of said register stack.

12. The computer system as recited in claim 11, wherein said selection logic units comprise multiplexers.

13. The computer system as recited in claim 11, wherein said selection logic units comprise read-only memories.

14. The computer system as recited in claim 11, further comprising:

a graphics controller coupled to the main memory; and a display device coupled to the main memory.

15. A microprocessor comprising:

an instruction cache configured to store instructions; and a floating point coupled to receive and execute instructions from the instruction cache, wherein the floating point unit comprises:

a future file comprising a plurality of physical registers, wherein the number of physical registers is larger than a predefined number of architectural registers in the floating point unit;

a plurality of storage locations, each configured to store a pointer to one of said registers, a first plurality of means for selecting a particular storage location for output according to a first decoded instruction; and a second plurality of means for selecting one of said outputs according to a second decoded instruction, wherein the contents of said plurality of pointer storage locations define a first order of a first subset of said plurality of physical registers, wherein the outputs of said first plurality of selection logic units define a second order of a second subset of said plurality of physical registers, and wherein the outputs of said second plurality of selection logic units define a third order of a third subset of said plurality of physical registers.

16. The microprocessor as recited in claim 15, wherein the physical registers in the future file are configured to store speculative states of the corresponding architectural registers.

17. The microprocessor as recited in claim 15, further comprising a plurality of functional pipelines configured to receive and execute floating point instructions within the floating point unit, wherein the plurality of functional pipelines include:

an add/alu/shift pipeline;

a multiply pipeline; and a load/store pipeline.

18. The microprocessor as recited in claim 15, further comprising a result queue configured to receive and store results from said floating point unit.

* * * * *